(12) United States Patent
Chukka et al.

(10) Patent No.: US 10,565,429 B2
(45) Date of Patent: Feb. 18, 2020

(54) IMAGE ANALYSIS SYSTEM USING CONTEXT FEATURES

(71) Applicant: Ventana Medical Systems, Inc., Tucson, AZ (US)

(72) Inventors: Srinivas Chukka, San Jose, CA (US); Yao Nie, Sunnyvale, CA (US)

(73) Assignee: Ventana Medical Systems, Inc., Tucson, AZ (US)

( * ) Notice: Subject to any disclaimer, the term of this patent is extended or adjusted under 35 U.S.C. 154(b) by 153 days.

(21) Appl. No.: 15/425,894

(22) Filed: Feb. 6, 2017

(65) Prior Publication Data

US 2017/0243051 A1 Aug. 24, 2017

Related U.S. Application Data

(63) Continuation of application No. PCT/EP2015/067972, filed on Aug. 4, 2015.

(60) Provisional application No. 62/032,897, filed on Aug. 4, 2014.

(51) Int. Cl.
*G06K 9/60* (2006.01)
*G06K 9/00* (2006.01)
*G06K 9/62* (2006.01)

(52) U.S. Cl.
CPC ......... *G06K 9/00147* (2013.01); *G06K 9/627* (2013.01); *G06K 9/6277* (2013.01); *G06K 9/6292* (2013.01); *G06K 2209/05* (2013.01)

(58) Field of Classification Search
CPC .. G06K 9/00147; G06K 9/627; G06K 9/6277; G06K 9/6292; G06K 2209/05; G06K 9/6269
See application file for complete search history.

(56) References Cited

U.S. PATENT DOCUMENTS

| 8,879,813 | B1* | 11/2014 | Solanki | G16H 30/20 382/128 |
|---|---|---|---|---|
| 10,347,015 | B2* | 7/2019 | Schieke | |
| 2009/0157571 | A1* | 6/2009 | Smith | G06K 9/6256 706/12 |
| 2013/0183707 | A1* | 7/2013 | Mangoubi | G06K 9/00147 435/29 |
| 2013/0208950 | A1* | 8/2013 | Athelogou | G06T 7/0012 382/107 |

(Continued)

OTHER PUBLICATIONS

Marek Kowal et al., "Nuclei Segmentation for Computer-Aided Diagnosis of Breast Cancer", Int. J. Appl. Math. Comput. Sci., 2014, vol. 24, No. 1, 19-31 (Year: 2014).*

(Continued)

*Primary Examiner* — Mekonen T Bekele
(74) *Attorney, Agent, or Firm* — Kilpatrick Townsend & Stockton LLP

(57) ABSTRACT

The present disclosure relates, among other things, to an image analysis method for identifying objects belonging to a particular objet class in a digital image of a biological sample. The method may include, among other things, analyzing the digital image for automatically or semi-automatically identifying objects in the digital image; analyzing the digital image for identifying, for each object, a first object feature value of a first object feature of said object; analyzing the digital image for computing one or more first context feature values; inputting both the first object feature value of each of the objects in the digital image and the first context feature value of said digital image into a first classifier; and executing the first classifier.

16 Claims, 6 Drawing Sheets

(56) References Cited

U.S. PATENT DOCUMENTS

| | | | | |
|---|---|---|---|---|
| 2014/0036054 A1* | 2/2014 | Zouridakis | ............ | G06T 7/0012 348/77 |
| 2014/0195472 A1* | 7/2014 | Kawagishi | ............... | G06N 5/04 706/46 |
| 2016/0253466 A1* | 9/2016 | Agaian | ................ | G06N 3/0427 382/128 |
| 2016/0350946 A1* | 12/2016 | Schieke | ................ | G06T 11/008 |
| 2017/0105668 A1* | 4/2017 | el Kaliouby | ............ | A61B 5/165 |
| 2018/0235467 A1* | 8/2018 | Celenk | ..................... | A61B 3/00 |

OTHER PUBLICATIONS

Marek Kowal et al., "Combined Classifier Based on Feature Space Partitioning" Int. J. Appl. Math. Comput. Sci., 2012, vol. 22, No. 4, 855-866 (Year: 2012).*

International Preliminary Report on Patentability dated Feb. 7, 2017 in corresponding PCT/EP2015/067972 filed on Aug. 4, 2015, pp. 1-15.

International Search Report and Written Opinion dated Feb. 4, 2016 in corresponding PCT/EP2015/067972 filed on Aug. 4, 2015, pp. 1-18.

Kowal, M., et al., Nuclei Segmentation for Computer-Aided Diagnosis of Breast Cancer, Int J Appl Math Comput Sci, 2014, 19-31, 24.

Phattthanaphong Chomphuwiset et al., Context-Based Classification of Cell Nuclei and Tissue Regions in Liver Histopathology, Med Image Understand Anal, 2011, 239-244, n/a.

Tu et al, Auto-Context and Its Application to High-Level Vision Tasks and 3D Brain Image Segmentation, IEEE Transactions on Pattern Analysis and Machine Intelligence, Oct. 2010, pp. 1744-1756, vol. 32, No. 10.

* cited by examiner

IMAGE ANALYSIS SYSTEM USING CONTEXT FEATURES

CROSS-REFERENCE TO RELATED APPLICATIONS

This patent application is a continuation of International Patent Application No. PCT/EP2015/067972, filed Aug. 4, 2015, which claims priority to and the benefit of U.S. Provisional Patent Application No. 62/032,897, filed Aug. 4, 2014. Each of the above patent applications is incorporated herein by reference as if set forth in its entirety.

TECHNICAL FIELD

The present disclosure generally relates to the field of automated analysis of biological images, particularly in the field of histology.

BACKGROUND

Identification of certain histological objects such as lymphocytes, cancer nuclei, and glands, is often one of the pre-requisites to grading or diagnosis of disease in histopathology images. The presence, extent, size, shape and other morphological appearance of these structures are important indicators for presence or severity of disease. Moreover, the number or ratio of specific objects (such as cells or cell nuclei) has diagnostic significance for some cancerous conditions, further motivating the need to accurately identify specific objects. For example, in immunohistochemical (IHC) assessment of estrogen receptor (ER) stained slides, positively and negatively expressed tumor cells need to be identified. The proportion of the ER-positively expressed tumor cells in the tumor cell count is computed as the ER score and used to predict if the patient will likely benefit from endocrine therapy such as tamoxifen. See, e.g., American Cancer Association, "Tumor Markers Fact Sheet," available at http://www.cancer.gov/about-cancer/diagnosis-staging/diagnosis/tumor-markers-fact-sheet.

Differences in staining protocols impose great challenges for automated nuclei detection and classification. See, e.g., Gurcan, M. N., Boucheron, L. E., Can, A., Madabhushi, A., Rajpoot, N. M., and Yener, B., "Histopathological image analysis: A review," Biomedical Engineering, IEEE Reviews in 2, pp. 147-171 (2009). Stain variations have been posed mainly as an image preprocessing problem, where global color distribution of the whole image is adjusted to align with a predefined range, or the color histogram landmarks of different stains or tissues are matched to those in a template image. See, e.g., Gurcan, M. N., Boucheron, L. E., Can, A., Madabhushi, A., Rajpoot, N. M., and Yener, B., "Histopathological image analysis: A review," Biomedical Engineering, IEEE Reviews in 2, pp. 147-171 (2009); see also Bagci, U. and Bai, L., "Registration of standardized histological images in feature space," in Proc. SPIE Medical Imaging 6914, pp. 69142V-1 (2008); see also Basavanhally, A. and Madabhushi, A., "Em-based segmentation-driven color standardization of digitized histopathology," in Proc. SPIE Medical Imaging, pp. 86760G-86760G, International Society for Optics and Photonics (2013). Some work shows that color standardization using hue-saturation-density (HSD) model improves color consistency without the need for color deconvolution or tissue segmentation. See, e.g., B. E. Bejnordi, N. Timofeeva, I. Otte-Holler, N. Karssemeijer and J. AWM van der Laak, "Quantitative analysis of stain variability in histology slides and an algorithm for standardization," in Proc. SPIE 9041, Medical Imaging 2014: Digital Pathology, 904108 (Mar. 20, 2014); see also Ruifrok, A. C. and Johnston, D. A., "Quantification of histochemical staining by color deconvolution.," Analytical and quantitative cytology and histology/ the International Academy of Cytology [and] American Society of Cytology 23(4), pp. 291-299 (2001); see also Basavanhally, A. and Madabhushi, A., "Em-based segmentation-driven color standardization of digitized histopathology," in Proc. SPIE Medical Imaging, pp. 86760G-86760G, International Society for Optics and Photonics (2013).

However, color distribution alignment aiming at improving stain appearance consistency is risky when classification needs to be performed among objects having the same stain. These objects can have subtle differences in color, while the prevalence of each object could vary significantly from image to image. Thus, for the same stain, cross-image differences in color distribution could be mainly caused by object prevalence instead of stain variation. Blindly aligning the color distribution can introduce more color confusion between objects to be classified.

A common problem in the automated recognition of objects of a particular object type in a digital image of a biological sample is that various features (like for example object size, stain intensity and others) vary greatly. This variability reduces the accuracy of many object recognition approaches, in particular in case object type identification is based on a feature that follows a Gaussian distribution whereby the expected mean of the distribution is only slightly different for objects of the two different object classes.

BRIEF SUMMARY

It is an objective of the present disclosure to provide for an improved image analysis system and method as specified in the independent claims. Embodiments of the disclosure are given in the dependent claims. Embodiments of the present disclosure can be freely combined with each other if they are not mutually exclusive.

In one aspect, the disclosure relates to an image analysis system for identifying objects belonging to a particular objet class in a digital image of a biological sample. The system comprises a processor and memory. The memory comprises interpretable instructions which, when executed by the processor, cause the processor to perform a method comprising:
    analyzing the digital image for automatically or semi-automatically identifying one or more objects in the digital image;
    analyzing the digital image for identifying, for each object, a first object feature value of a first object feature of said object;
    analyzing the digital image for computing one or more first context feature values, the first context feature values each being a derivative of the first object feature values or of other object feature values of a plurality of objects in the digital image or being a derivative of a plurality of pixels of the digital image;
    inputting both the first object feature value of each of the one or more objects in the digital image and the one or more first context feature values of said digital image into a first classifier; and
    executing the first classifier, the first classifier thereby using the first object feature value of each object and the one or more first context feature values as input for automatically determining, for said object, a first likelihood of said object being a member of the object class.

Said features may be advantageous, because contrary to state of the art approaches that consider feature variations, e.g. staining intensity variations, as an artifact that is "leveled/normalized out", the classifier takes both a object feature value into account that characterizes an object well within a given digital image and that takes into account a "global" or "context" property value that is derived, e.g. by means of a group statistic, from a plurality of objects of said digital image or from a plurality of pixels of said image. Thus, two context feature values having been derived from different digital images respectively reflect context information of objects of the respective images. For example, the context feature value can be selected and calculated such that inter-image variation of a majority of the objects is reflected by the context feature value. For example, in case the sizes of cell nuclei differ in different images, also the statistical mean or median of the cell size of said two different images will vary.

This is particularly advantageous in respect to object features whose value both depends on the membership of said object to a particular object class and depends on artifacts caused by the handling, preparation and/or staining of the biological sample from which the image is derived and/or depends on natural biological variations. For example, the intensity value of pixels of a particular object type, e.g. the pixels representing a cell of a particular cell type, may substantially depend on biological aspects (i.e., the membership in respect to the object representing a cell of a particular cell type) as well as stain variations. For example, the intensity values of pixel blobs in a digital image may show a great heterogeneity. Said heterogeneity may depend on biological aspects (the cell type, the disease biology, biological variations between different subjects) and/or on staining artifacts. For example, a larger amount of stain may have been applied on one side of the slide than on the other due to a not exactly horizontal orientation of a slide during staining. It is also possible that one slide has a stronger staining intensity than another slide of comprising another sample of the same tissue due to differences in staining protocols and that therefore the intensities of respective whole slide images differ from each other. In addition, or alternatively, it is possible that a particular patient has a higher expression rate of a protein that is used as a biomarker and that is selectively stained, resulting in a variability of the staining intensities of the cells of the two patients.

Said staining heterogeneity imposed great challenges for automated nuclei detection and classification (see, e.g., Gurcan, M. N., Boucheron, L. E., Can, A., Madabhushi, A., Rajpoot, N. M., and Yener, B., "Histopathological image analysis: A review," Biomedical Engineering, IEEE Reviews in 2, pp. 147-171 (2009)) as it is difficult to extract image features that are invariant to the inter image appearance variations.

To the contrary, embodiments of the disclosure may reduce the negative impact e.g. of staining and biological heterogeneity (not related to object class-membership) on the accuracy of the classifier by calculating one or more context feature values respectively being indicative of whether the heterogeneicity of property values is caused predominantly by inter-image variation or by class-membership of objects. By applying a classifier that takes one or more context feature values of a particular image as a further predictive feature into account when classifying an object, the classification accuracy may be increased.

Thus, embodiments of the disclosure may have the advantage that the heterogeneity of an object feature value in a biological image is neither completely ignored as an artifact nor is the heterogeneity directly used as an input value without any correction for staining or sample preparation artifacts or biological heterogeneity that is not caused by class membership. By computing one or more context feature values for each digital image and by extracting one or more object feature values of each considered object, information is provided to a classifier that enables the classifier to level out object feature variability caused by other factors than the class-membership of the object. Said factors could be, for example, biological variability not caused by class (e.g. cell type) membership, variability caused by staining or sample handling effects or the like.

For example, instead of performing color distribution alignment for improving stain appearance consistency (which is risky when classification needs to be performed among objects having the same stain whose stain intensity may at least partially depend on class-membership), embodiments of the disclosure may compute a context feature value, e.g. "median stain intensity of all objects in an image". These objects can have subtle differences in color, while the prevalence of each object could vary significantly from image to image or from area to area. Thus, for the same stain, inter-image differences in color distribution that are mainly caused by object prevalence instead of stain variation are preserved in the form of the context feature values. Compared to an approach based on blindly aligning and normalizing the color distribution of different digital images derived from different cell slides (which can introduce more color confusion between objects to be classified), embodiments of the disclosure may increase classification accuracy by extracting one or more context feature values to be used as an additional input (in combination with one or more feature values of the objects in the respective images) during classification, thereby ensuring that biological information, i.e., object feature value heterogeneity caused by the membership of an object to a particular class, is not lost.

According to embodiments, the determination of the first likelihood comprises using, by the first classifier, the first context feature value for leveling out first object feature value variations caused by factors other than the membership of the object to one of a plurality of object classes. The implementation of this process may depend on the particularities of the classifier used and may be the result of a training process, so an explicit implementation of said step may not be required.

According to embodiments, the digital image for which the one or more context features are calculated is an image of a biological sample or a whole tissue slide (i.e., a "whole slide image"). Calculating one or more context feature values for each of two or more whole slide images may have the advantage that differences, e.g. staining differences, resulting from different sample preparation protocols (e.g. different staining protocols) applied on two different tissue slides that result in object feature value differences of objects in two respective digital images can be leveled out. The context feature values may allow the classifier to identify heterogeneity of object feature values of different whole slide images resulting from differences in sample preparation and staining protocols applied to the two tissue slides.

According to other embodiments, said digital image is an automatically or manually selected sub-region within an image of a whole slide or a biological sample. The sub-region may be, for example, a field of view (FOV) of the digital image.

For example, a particular slide may have been positioned in a way that during the staining phase a larger amount of stain accumulated on a first half of a cell slide than on the second half of the cell slide. As a result, all objects in a first FOV representing the first half of the slide have—on average—a higher intensity value resulting from said stain than the objects of a second FOV, the second FOV representing the second half of said slide. Such staining artifacts may simply be leveled out by calculating context feature values for each of said sub-regions separately. According to other examples, the first FOV may comprise a different tissue section than the second FOV. The majority of cells in the tissue section in the first FOV may consist of positively and negatively stained tumor cells while the majority of cells in the second FOV may consist of lymphocyte cells. Thus, the prevalence of cell types may differ in different FOVs, and thus may differ in different sub-regions of the digital image.

Thus, variations in feature values of objects (e.g. variations in respect to object size, shape, and staining intensity) may be caused by differences in the staining protocols used for generating the two different digital images and/or differences in the cell type prevalence on different slides or slide regions represented by the different digital images.

According to some embodiments, the method comprises selecting the sub region by automatically or manually identifying a sub region of the digital image whose objects have a comparably low heterogeneity in respect to one or more of their properties compared to the objects within other sub regions of said digital image. And using the identified sub region as the digital image. This may have the advantage that intra-slide heterogeneity resulting from sample preparation and staining protocol artifacts is reduced.

According to some embodiments, the plurality of objects in the digital image used for calculating the first (and any second and/or further) context feature value is the totality of objects within said digital image. An object may be e.g. a pixel blob derived from a particular channel (e.g. a "blue pixel blob", a "brown pixel blob") or any other form of pixel set that is identified as a potential member of one of a plurality of predefined object classes.

According to some embodiments, the method implemented by the system further comprises:
a) analyzing the digital image for identifying, for each object, a second object feature value of a second object feature of said object;
b) analyzing the digital image for computing one or more second context feature values, each second context feature value being a derivative of the second object feature values or of other object feature values of the plurality of objects in the digital image or being a derivative of a plurality of pixels of the digital image;
c) inputting both the second object feature value of each of the one or more objects and the one or more second context feature values of said digital image into a second classifier;
d) executing the second classifier for automatically determining, for each of the objects, by using the second object feature value of the object and the one or more second context feature values, a second likelihood of being a member of the object class; and
e) computing, for each of the objects, a combined likelihood of being a member of the object class from the first and the second likelihood computed for said object.

Said features may be advantageous as the combination of two or more object features and respective one or more context feature values may increase the accuracy of object classification and/or may be helpful where a single context-aware feature is insufficient to confidently categorize the object.

Using one object feature and multiple context features as input for a particular object feature specific classifier may increase the accuracy of said individual classifier. In some embodiments, only a single object feature and one or more assigned context features are used as input of a classifier and/or the classifier is trained on a single object feature and one or more context features.

Calculating class-membership likelihoods for each object feature individually by a respective classifier having been trained on said particular object feature and its associated one or more context features and then combining said likelihoods for calculating a combined likelihood may in particular be helpful where a single object feature and respective context features is insufficient to confidently categorize the object as being a member of a particular object class.

The likelihood calculated for each individual object feature (also referred to as "context-aware feature") may be, for example, a numeric value being indicative of the probability that an object is a member of a particular object class.

For example, the first classifier may be a support vector machine (SVM) having been trained on a first object feature "cancer cell size" and a second classifier may be an SVM having been trained on a second object feature "intensity of blue color" of a nucleus stained with hematoxylin.

SVMs are supervised learning models with associated learning algorithms that analyze data and recognize patterns, used for classification and regression analysis. Given a set of training digital images with pixel blobs, each marked for belonging to one of two categories, a SVM training algorithm builds a model that assigns new examples into one category or the other, making it a non-probabilistic binary classifier. The SVM classifier may be a linear classifier. Alternatively, if a non-linear SVM kernel function is used, the SVM classifier can be a non-linear classifier. An SVM model is a representation of the examples as points in space, mapped so that the examples of the separate categories are divided by a clear gap that is as wide as possible. New examples are then mapped into that same space and predicted to belong to a category based on which side of the gap they fall on.

One example is presented in the figure description of FIG. 8 for SVMs, but any other form of supervised learning classifier could be applied as well.

According to some embodiments, each object of the object class has assigned at least one further object feature. The system comprises the first and second classifier and comprises a further classifier for each of the further object features. For example, the system may comprise a non-transitory storage medium having stored thereon the first, second and one or more further classifiers and may have stored program logic, e.g. an image analysis program, configured to execute the classifiers and to feed input data into the classifiers. The image analysis program may be configured for performing a method according to any one of the embodiments described herein.

According to some embodiments, the first, second and/or any further object feature is a feature whose value both depends on the membership of an object to a particular object class and depends on artifacts caused by the handling, preparation and/or staining of the biological sample from which the image depicting said object is derived and/or depends on biological heterogeneity that is not caused by object-class membership.

According to some embodiments, the method implemented by the image analysis system further comprises:
  repeating the steps a) to d) for each of the further object features for respectively calculating a further likelihood of each object of being a member of the object class; and
  computing, for each of the objects, a combined likelihood of being a member of the object class at least from the first, the second and each of the further likelihoods.

Considering multiple object features values may have the advantage that the accuracy of the object classification may be increased.

According to embodiments, in addition to the likelihoods derived from the first, second and/or each of the further likelihoods, one or more additional features are used as input to the end classifier to compute the combined likelihood. Said additional features can be, for example, additional object features not having associated any context features, e.g. an object feature such as the "compactness" of an object. The at least one additional feature may in addition or alternatively be a combination of a further object feature with one or more context features associated with said further object feature.

According to embodiment, each of the first, second and/or third classifiers is trained such and/or is applied on test images such that each of said classifiers uses exactly one object feature and one or more context features associated with said object feature as input. Thus, each classifier is trained on a respective object feature and its associated one or more context features and is configured to predict class-membership by using the predictive power of the object feature it is trained on, whereby the associated one or more object features are used as input for leveling out inter-image variability of said object feature.

According to embodiments the object class is one of: a lymphocyte cell, a tumor cell, a cell of a particular tissue type, a cell positively stained with a particular biomarker, or a nucleus of one of said cell types. For example, cells of a particular tissue type, e.g. the liver, may—at least on average—have a different diameter or shape or staining intensity in respect to a particular stain than lymphocytes, lipocytes, lung cells, muscle cells or the like. Thus, on average, a liver cell may differ in respect to multiple properties (average staining intensity, average size, average distance from a neighboring cell, shape, e.g. curvature, etc) from a lymphocyte, whereby said properties may in addition vary in dependence on sample preparation and staining processes. Also, it is possible that the size and/or staining intensities of cell nuclei are used as properties for classification. Thereby, accuracy of the object classification may greatly be increased. For example, the method may be used for automatically determining if a particular cell is a "normal" tissue cell or is a cancer cell originally derived from a different tissue type (e.g. the liver) that has meanwhile metastasized to regional lymph nodes and distant organs.

According to embodiments, the first object feature is one of:
i. an intensity value of the object, the intensity value correlating with the amount of a stain or a biomarker bound to the object represented by the object;
ii. a diameter of the object;
iii. a size of the object, e.g. the area or number of pixels covered by the object;
iv. a shape property of the object;
v. a texture property of the object
vi. a distance of an object to the next neighbor object.

In case a second and/or a further object feature is analyzed according to said embodiment, the second object feature and/or the further object feature is a remaining one of the properties i-vi. A plurality of other object features may also be used by the classifiers of these and other embodiments.

For example, in case the first object feature is an intensity value of an object resulting from staining the biological sample with a particular stain, the second object feature may be a diameter of the object and the further object feature may be the size, i.e., the size of the area in the digital image occupied by object pixels, a shape property, and the like.

It has been observed that any one of said object features may represent a feature (i.e., a "property"), whose heterogeneity may be the effect both of biological aspects (which may encode information being indicative of the class membership likelihood of an object as well as other biological factors such as the origin of the tissue depicted by the image) as well as of the used sample processing and staining protocol. A significant portion of inter-image variability is typically caused by factors having nothing to do with class-membership of objects.

For example, it has been observed that the distance between lymphocyte cells is typically smaller than between two breast cancer cells, so the distance of a cell (or a nucleus) to its next neighboring cell (or nucleus) may be an indicator of the type of cell (and, correspondingly, the type of nucleus) an object belongs to.

According to another example, a particular texture where dark stripes and bright stripes alternate every 0.5 μm (see, for example, the texture of striated muscles) may be typical for striated muscle cells, while other muscle cells or other cell types may lack such a texture. A context feature of a texture could be, for example, the mean or median of any striated texture observed in an object.

According to another example, stroma cells in breast cancer usually have elongated shape and are located in a region having many line-shaped structures (or linear textures). Some tumor cells, because of slide cutting process, may also appear elongated, but the surrounding region does not have the linear textures. Therefore, the texture of a local surrounding region can be used as one object feature to differentiate stomas and tumor cells. The linear texture can be characterized by the entropy (an information theory term) of the gradient direction histogram of that region. The context feature can be the entropy of the gradient direction histogram of the whole image.

According to another example, the objects representing nuclei are derived by applying a generic nuclear detection algorithm on a digital image. The nuclear detection algorithm may be applied on the whole digital image or on a sub-region of the image that may be selected manually by a user via a graphical user interface. Depending on the embodiment, the identification of the objects may be performed fully automatically by the image analysis system or semi-automatically by the image analysis system under the control of the user who may select an image area within which the objects shall be identified or may modify the set of automatically identified objects by selecting or deselecting one or more objects manually via the graphical user interface.

The identified nuclei may constitute candidates for the object "nucleus of a lymphocyte cell" or "nucleus of a tumor cell". One of the properties could be the intensity of a particular color in the digital image resulting from a nuclear specific staining, e.g. a "blue" color intensity resulting from hematoxylin staining. Another object feature may be the diameter of a nucleus. Nuclear diameter and staining intensity may be properties having a significant predictive power in respect to whether a nucleus belongs to a lymphocyte cell or a tumor cell: a typical lymphocyte nucleus is smaller than a typical tumor cell nucleus and has higher intensity values in a "blue" color channel resulting from hematoxylin than a tumor cell nucleus. According to embodiments of the disclosure, the nuclei are classified as being nuclei of a lymphocyte or of a tumor cell, and thus also the whole cell comprising a particular nucleus is classified as a lymphocyte or a tumor cell. The question if only nuclear properties or whole-cell properties or a mixture thereof are considered depends on the type of object classes, e.g. cell types, to be identified.

According to embodiments, the first, second and/or further object feature values input to a respective classifier are specified manually, e.g. by an operator selecting one or more of a plurality of predefined properties and corresponding classifiers. Alternatively, the properties are identified and specified by an advanced feature discovery (AFD) method. An example of AFD is described in O. Dor and Y. Reich, "Enhancing learning algorithms to support data with short sequence features by automated feature discovery," Knowledge-Based Systems, v52, pp. 114-132 (2013). According to still other embodiments, the properties are identified and specified by a minimum redundancy and maximum relevance (mRMR) rules. An example for the application of mRMR rules is described at Peng, H. C., Long, F., and Ding, C., "Feature selection based on mutual information: criteria of max-dependency, max-relevance, and min-redundancy," IEEE Transactions on Pattern Analysis and Machine Intelligence, Vol. 27, No. 8, pp. 1226-1238, 2005. The precise methods of identifying object features will vary by the specific application.

According to embodiments, the first, second and/or further object features of the objects:
vary within all objects in the digital image and/or
vary within objects of the same digital image, the digital image being a whole slide image; and/or
vary within objects of the same digital image, the digital image being a sub-region of a whole slide image.

According to embodiments, the inter-image variability is caused, to a significant extent, by factors other than object class membership, said factors comprising:
the images depict different tissue samples derived from the same organism, the tissue type having an impact on the object feature used for classification; and/or
the images depict different tissue samples derived from different organisms, the species membership having an impact on the object feature used for classification; and/or
the images depict different tissue samples treated by different sample treatment protocols, the sample treatment protocol having an impact on the object feature used for classification; and/or
the images depict different tissue samples treated by different staining protocols, the staining protocol having an impact on the object feature used for classification.

According to embodiments, the computing of the first context feature value comprises computing a statistical average of the first object feature values of the plurality of objects in the digital image. In addition or alternatively, the computing of the second context feature value comprises computing a statistical average of the second object feature values of the plurality of objects in the digital image. In addition or alternatively, the computing of the each further context feature value comprises computing a statistical average of the respective further object feature values of the plurality of objects in the digital image.

The statistical average can be, for example, the arithmetic mean, a median, a mid-range, an expectation value or any other form of average derived from the object feature values of the totality or sub group of objects in the area of the digital image.

According to embodiments, the method further comprises generating the first classifier. The first classifier is generated by:
reading, by an untrained version of the first classifier, a plurality of digital training images from a storage medium, each training digital image comprising a plurality of pixel blobs respectively representing objects of one or more different object classes, each pixel blob being annotated as a member or as a non-member of the object class;
analyzing each of the training digital images for identifying, for each annotated pixel blob, a training first object feature value of the first object feature of said pixel blob;
analyzing each of the training digital images for computing one or more training first context feature values, each training first context feature value being a derivative of the training first object feature values or of other training object feature values of a plurality of pixel blobs in said training digital image or being a derivative of a plurality of pixels of the training digital image;
training the untrained version of the first classifier by inputting, for each of the pixel blobs, at least the annotation, the training first object feature value and the one or more training first context feature values to the untrained version of the first classifier, thereby creating the first classifier, the first classifier being configured to calculate a higher likelihood for an object of being member in a particular object class in case the first object feature value of said object is more similar to the training first object feature values of the pixel blobs annotated as being a member of said particular object class than to the training first object feature values of pixel blobs annotated as not being a member of said particular object class, whereby the likelihood further depends on intra-image context information contained in the first or other context feature value.

A "training object feature" is an object feature of a pixel blob of a training digital image. A "training context feature" is a context feature derived from object features of pixel blobs or pixels of the training digital image. The analysis of each training digital image for identifying the training first object feature values and the training first context feature values can be performed by the untrained version of the classifier or by a statistics module, e.g. a statistical module of an image analysis software that provides the results of the statistics analysis to the untrained version of the classifier.

According to embodiments, the calculation of the first likelihood calculated by the trained first classifier comprises using, by the first classifier, a first context feature value of an object for leveling out first object feature value variations caused by factors other than the membership of the object to one of a plurality of object classes.

According to embodiments, the training of the untrained version of the first classifier comprises identifying, by the first classifier, one of a plurality of context features capable of increasing the classification accuracy of the first classifier using the first object feature for classifying objects. The identified context feature increases the classification accuracy by leveling out first object feature value variations caused by factors other than the membership of the object to one of a plurality of object classes. For example, the training comprises modifying a classifier model of the first classifier in a way that the trained classifier, when receiving an object feature value and a context feature value of a context feature associated with said object feature as input, normalizes the received object feature value relative to image-specific context information provided by said context feature value.

According to embodiments, each classifier is trained on one single object feature and one or more context features. This may be advantageous as features can be selected and used as object features that have a significant predictive power in respect to class membership of an object while a context property can be selected such that it is capable to level out the object feature variability not caused by class-membership, e.g. staining artifacts or the biological source organ or organism of the tissue depicted by the image. If one would add multiple object features and multiple context features during training into the same classifier, it is very likely that the automatically generated model of the classifier assigns dominant weights to the object feature and largely ignores the context features due to the lack of predictive power of the context features (by itself) in respect to class membership. Thus, training a classifier on multiple object features would in fact reduce the capability of the resulting classifier to level out the object feature variability not caused by class-membership.

The object features and corresponding one or more context features used during the training process may be selected, for example, manually, and corresponding automated functions of the classifier may be implemented. For example, the cell size has a significant predictive power in respect to cell class membership and thus may be chosen as an object feature on which a respective classifier shall be trained. A corresponding context feature that by itself lacks a predictive power in respect to class membership may—in some cases—be the mean cell size of all cell blobs in a digital image.

According to other embodiments, a classifier is trained using one object feature and a plurality of candidate context features. A candidate context feature is a feature whose capability to level out the variability of the object feature not caused by class-membership has not been evaluated yet. For example, various group statistics of the sizes, intensity, shape or other parameters of the pixel blobs in the training digital image or properties of a plurality of pixels in the training image are used, according to embodiments, as candidate context features and are input to the classifier together with the annotations and the object feature values of the one object feature in the training phase. The training phase may comprise an iterative or non-iterative learning process during which the ones of the candidate context features are automatically identified which show the highest capability of compensating variability of the object feature that is not caused by class-membership of the object. This may be advantageous as also context features may be identified which do not follow the above-described examples of an object-feature/group statistics of object feature—based relationship. Thus, an iterative or non-iterative learning process can be used to automatically identify context features whose capability to level out object feature variability not resulting from class-membership cannot be identified by following the above mentioned group statistics approach.

In a further aspect the disclosure relates to an image analysis method for identifying objects belonging to a particular objet class in a digital image of a biological sample. The method is performed by a processor of an image analysis and comprising:

analyzing the digital image for automatically or semi-automatically identifying objects in the digital image;

analyzing the digital image for identifying, for each object, a first object feature value of a first object feature of said object;

analyzing the digital image for computing one or more first context feature values, each first context feature value being a derivative of the first object feature values or of other object feature values of a plurality of objects in the digital image or being a derivative of a plurality of pixels of the digital image;

inputting both the first object feature value of each of the objects in the digital image and inputting the one or more first context feature values of said digital image into a first classifier; and executing the first classifier, the first classifier thereby using the first object feature value of each object and the one or more first context feature values as input for automatically determining, for said object, a first likelihood of said object of being a member of the object class.

A "blob" or "pixel blob" as used herein is a region in a digital image that differs in properties, such as brightness or color, compared to surrounding regions. For example, a blob may be a set of adjacent pixels having a particular intensity value range. Some of the blobs may be classified as "objects". Blobs may be detected, for example, by differential methods, which are based on derivatives of the function with respect to position, and methods based on local extrema, which are based on finding the local maxima and minima of the function. According to embodiments, blob detection is used to obtain regions of interest for further processing.

An "object" in a digital image is a set of adjacent or nearby pixels in the digital image that share one or more properties which indicate that the object could possibly belong to a particular object class, e.g. the class "lymphocyte cell". However, further analysis is necessary, e.g. a classification algorithm, in order to automatically determine if a particular object is in fact member of and should be assigned to a particular object class or not.

A "classifier" as used herein is a program logic capable of identifying to which of a set of categories (object classes) a new observation (an object) belongs by analyzing property values, also referred to as "object feature values" or "explanatory variables", of the new observation to be categorized. A classifier may be obtained on the basis of a training set of data containing observations (annotated pixel blobs) on whose category membership is known (annotated pixel blobs are objects having already been assigned to an object class manually or automatically). An example would be assigning a given email into "spam" or "non-spam" classes or assigning a particular object as "tumor cell" or "non tumor cell". According to some embodiments, the classifier is obtained by means of applying a supervised learning approach, e.g. by training an untrained version of a classifier on a training set of correctly identified and annotated pixel blobs, whereby the number and type of object classes is known in advance.

An untrained version of a classifier is a program logic that specially adapted for performing a classification task according to a particular classification approach (e.g. based on neural networks, support vector machines, etc.) but which has not yet been trained on a training data set comprising object instances of the object class to be identified by the trained version of the classifier. Accordingly, a trained version of the classifier is a version of the program logic that was modified during a training phase by using the information contained in an annotated training data set, e.g. a digital image comprising hundreds or thousands of pixel blobs respectively annotated as being a "tumor-cell", "lymphocyte cell" or other cell type class member.

According to some embodiments, the image analysis is configured for analyzing a plurality of object features by respective, object feature-specific analyzers. The overall likelihood of a particular object of being member in an object class is derived by processing all object feature specific likelihoods for obtaining a final, combined likelihood score of the object being member of a particular object class. According to embodiments, an "analyzer function" is implemented as an analyzer.

A "property", also referred herein as "explanatory variable" or "feature" may be categorical (e.g. "circular", "ellipsoid", or "stick-like", for cell shape), ordinal (e.g. "large", "medium" or "small"), real-valued (e.g. the average cell diameter in µm) or integer-valued (e.g. an intensity value expressed in a scale from 0-255).

An "object property" or "object feature" refers to a property of an object of a particular class that can be used to identify objects within a digital image as being a member of said class. Examples of said properties include the size, shape and average intensity of all pixels within the object. An object property can be a feature of an object class that identifies pixel-representations of objects which are member of said class well within a digital image. For example, in ER stained breast cancer images, nucleus size is an important object property for identifying lymphocytes because lymphocytes are usually smaller than cancer cells in the same image. The absolute nucleus size may slightly vary in different patients or tissue sections and may thus vary in digital images derived from different cell slides. However, in each patient and in each tissue section, lymphocyte nuclei will at least on average be smaller than cancer cell nuclei within the same specific digital image or sub-region of said image. By calculating context feature values for a particular image, the descriptive power of an associated object feature may be increased.

According to embodiments, an "object property", also referred to as "object feature", is a property indicating capable of characterizing aspects of a particular object. For example, the object feature may be "diameter of a nucleus" and an image analysis algorithm may automatically determine that a particular cell nucleus candidate has the respective nuclear diameter of "6 µm". The object feature value can be an absolute measure, e.g. "6 µm" for a cell nucleus diameter or "211" for an average intensity value of a pixel blob constituting an object. The one or more object features whose values are determined can be input to the classifier are object features having predictive power in respect to the class-membership of objects.

According to embodiments, a "global property", also referred to as "context feature", is a property that is computed from object feature values of a plurality of objects within a digital image or from a plurality of pixels of the digital image. For example, it can be a statistical average of the object feature values of a particular object feature of said plurality of objects. The plurality of objects may be the total number of objects in said digital image or a subset thereof. As a context feature value is derived from a plurality of objects of a digital image, it is indicative of inter-image variation. This means that in case e.g. the average "blue intensity" of objects in a first image is larger than the average "blue intensity" of objects in a second image, this is reflected by two different global ("average") intensity values derived from said two images.

According to embodiments, the process of training an "object feature specific" classifier comprises inputting a plurality of object feature values of a particular object feature of respective pixel blobs contained in a training image and inputting one or more context feature values into the object feature-specific classifier. Thus, the object feature-specific classifier "learns" an association between a first object feature for which the classifier was created and whose values are extracted from the objects and at least one first or other context feature value that is indicative of inter-image variation of the first object feature. The learned association reflects the degree of the capability of the context feature to level out variability of the context feature not caused by class-membership. According to some embodiments mentioned before, the process of training the object feature specific classifier may also comprise iteratively or non-iteratively identifying one or more of a plurality of context feature candidates capable to act as context features.

Often, the context feature that is "learned" as being associated with the first object feature is a statistical average of the first object feature values of a plurality of objects in a digital image. For example, the first object feature for which a classifier is specifically trained may be "object diameter". Said classifier is fed, during the training phase, with multiple context feature values, e.g. the average pixel blob diameter, the average blob area of the pixel blobs in the image, and so like. In this case, the classifier learns in the training phase: "given a particular first object feature value of an object, what object feature can reliably indicate if the object has assigned a large amount of said first object feature value or a small amount of said object feature value given the object feature values of other objects within said digital image". In other words, the classifier learns in the training phase an association between the object feature for which said classifier is created (and whose object feature values said classifier is configured to receive as input) and at least one global parameter, whereby the global parameter may be derived from object feature values of said specific object feature for which the classifier was trained or may be derived from values of another object feature.

Thus, according to embodiments in which a context feature is derived as a statistical average of the object feature, the training process may comprise automatically identifying and learning, by the classifier of the particular object feature, at least one object feature whose context feature value of the digital image reliably indicates if an object has assigned a large amount or a small amount of a particular object feature compared to other objects in the same digital image. Thus, the context feature value on its own may lack any predictive power in respect to class membership of a particular object, e.g. because a context feature value is not particular to a particular object. Rather, the context feature value is an object feature value derived from a plurality of objects or a plurality of pixels in an image, whereby the context feature value increases—if input together with an object feature value of an object of a particular object feature into a classifier—the predictive power of said object's feature value.

In many cases, the object feature for which a classifier is created and the feature from which the context feature value is computed as a group statistic are identical. For example, the first classifier could be created for the first object feature "object diameter" and the corresponding context feature could be "median of the diameter of all objects in the digital image". The median pixel blob diameter in combination with the diameter of a particular object convey the information if the object in the context of other objects in the same image has a diameter that is smaller or larger than the median diameter. This may enable a classifier to level out cell size variability caused by sampling handling effects or caused by different sources of the cells (tissue or patient) reflected in different digital images. The classifier does, however, not have to explicitly compute the difference.

According to some other examples, however, the first object feature values of the objects and the context feature value may be related to different properties. For example, if we consider the pixel intensity value as the height of a surface in 3D space, then the surface of a HTX stained tumor cell nucleus usually appears "smoother" than that of a HTX stained lymphocyte nucleus. Thus, one object feature of an object for which a respective classifier is trained and generated can be the "curvature of the surface". Said object feature can also be affected by the staining intensity of an object and thus can be affected by inter-image and intra-image variation. The classifier trained for the "curvature of the surface" may in addition be fed with a context feature value that is the median image intensity.

The classifier will learn "how likely the object is a tumor cell nucleus given its absolute surface curvature and the global image staining intensity". Said features may be advantageous as an explicit assignment of a particular context feature to a particular object feature can be avoided. Instead, a programmer of the classifier may define a plurality of global properties for which context feature values are calculated during the training phase and which are used as input for the classifier. The context feature value can be a statistical value obtained from a plurality of values of the object feature the classifier was trained for or of another object feature or of the whole image. During the training phase, the classifier builds a model that inexplicitly specifies the relation between the object feature and one or more of the context features. The model of the object-feature-specific classifier tells how to combine the "object feature" value of a particular object and the context feature value mathematically to derive a likelihood value that optimally separates the training pixel blobs annotated with different object class labels when considering alone the aforementioned object feature and the associated context feature value. This likelihood represents a refined version of an original object feature specific likelihood for class membership. This means that the predictive power of the object feature value of an object is used for predicting a likelihood of the object to be a member of an object class, whereby the likelihood calculation of the feature specific classifier is refined by taking into consideration also the information contained in the context feature value that levels out the variations causes by factors other than object type differences.

According to some embodiments, the context feature value is the arithmetic mean or median of the size or diameter of the objects in an image. The context feature is used to indicate whether the object is larger or smaller than the average size of all other objects in said image. Thus, even in case all cells in an image should be larger on average than the cells of another image e.g. due to sample processing protocol differences (different osmotic properties of a buffer solution) or due to different patients having slightly different cell sizes, the information if a particular cell is smaller or larger than a median derived from a mixture of different cell types may increase accuracy of a size-based classifier.

According to some embodiments, one of the properties of the objects that are computed is the size, e.g. the diameter or total number of pixels in an object. The associated context feature value is an arithmetic mean or median of the intensity values of all objects in an image. The context feature may indicate whether a particular object has a brighter or darker intensity than the average intensity of all other objects in an image area, whereby the variation in intensity value may partially be caused by biological/cytological differences of different cell type classes and partially be caused by staining and sample processing artifacts.

In case structural features such as "roundness of object outline" of an object is used for training a object feature-specific classifier and for predicting class-membership of an object, one or more context feature values are computed and input to the classifier during the training phase that indicate whether the roundness of an object is similar or dissimilar to the "roundness" of all other objects in an image area. If the classifier learns during the training phase that a context feature value can increase the accuracy of the class-membership prediction based on the "roundness" object feature values, the classifier associates said context feature value with the object feature "roundness" by automatically modifying its predictive model in a way that the "roundness" based class membership prediction is modified by the said identified and learned context feature value.

According to some further examples, an object feature "shortest distance to the next neighbor object" of the objects is used for calculating a likelihood that a particular object from which said object feature value was derived belongs to a particular object class. In this case, a corresponding classifier learns that e.g. a context feature "median of the shortest distance of each of the objects in a digital image to their respective next neighbor object" should be used as additional input during classification, because said context feature conveys the information if the "shortest distance to the next neighbor cell" of a particular object is smaller or longer than the average "shortest distance" of other objects in the digital image.

According to some embodiments, two or more of the above mentioned classifiers are used for respectively calculating an object feature-specific likelihood of a particular object being a member of an object class. Said likelihoods are combined by an end-classifier or other type of program logic for calculating a final likelihood of an object belonging to a particular class.

According to some embodiments, the classifier or a pre-processing module of the classifier implements a function or program logic for calculating the context feature as a statistical average of a feature value of a plurality of objects of a digital image or as a statistical average of a feature value of a plurality of pixels in the digital image.

According to embodiments, the first object feature value is a value of a first feature or "property" of a particular object in a digital image. It can be an object feature value that is derived from an object directly by analyzing only the pixels of the object or its neighboring pixels in close proximity to said object. A typical example would be a "size" or "intensity value" of a particular pixel blob representing an object. A "training first object feature value" is a value of the first object feature of a pixel blob in a training digital image. The training first object feature value can be obtained by analyzing an object and optionally also the neighboring pixels in close proximity to said pixel blob. The training digital image is annotated with information on the membership of pixel blobs acting as objects which may belong to one out of a plurality of different object classes, e.g. different cell types. A "training second object feature value" is a value of a second object feature that is obtained by analyzing a training digital image, and so on.

A "digital image" is a numeric representation (normally binary) of a two-dimensional image. Depending on whether the image resolution is fixed, it may be of vector or raster type. By itself, the term "digital image" usually refers to raster images or bitmapped images.

The present disclosure relates to methods, systems, and apparatuses for incorporating object and context features derived from images of biological samples, wherein the methods, systems, and apparatuses compensate for cross-image variations. A set of context-aware features is generated for an object being analyzed in an image of a biological sample, which may be input into an end classifier and used to identify the object. The context-aware features may be generated by using an object feature of the object being analyzed and a set of context features associated with the object feature to train a classifier, which generates the context-aware feature.

The embodiments of the various methods and systems described herein can freely be combined with each other.

In an embodiment, a method of automatically calculating a context-aware feature of an object in an image of a biological sample is provided, the method comprising analyzing the image on a biological image analysis device programmed to perform a classifier function, wherein the classifier function calculates the at least one context-aware feature for the object by combining:
  at least one object feature extracted from the object, wherein the object feature is characteristic of the object in context of the image and wherein the object feature is susceptible to cross-image variation; and
  at least one context feature associated with the object feature, wherein each context feature is a characteristic of a group of objects or a group of pixels within the image from which the object feature was extracted.

The object feature(s) may be identified empirically or may be identified automatically, such as by an advanced feature discovery method or by minimum redundancy and maximum relevance (mRMR) rules. In any of these embodiments, the at least one context feature may be a feature capable of capturing cross-image variation among the same object feature in different images, for example, a group statistic of the object feature.

According to embodiments, the classifier function is a classifier as described herein for various embodiments of the disclosure.

In another embodiment, a method of pre-training a classifier function of a biological image analysis device to calculate a context-aware feature of an object of an image of a biological sample is provided, the method comprising analyzing a training set of objects from a plurality of different images of biological samples on the biological image analysis device, wherein the biological image analysis device is programmed to perform a classifier training function by calculating for each object of the training set a likelihood that the object belongs to a class of objects by combining:
  at least one object feature extracted from the object, wherein the object feature is characteristic of the object in context of the image and wherein the object feature is susceptible to cross-image variation; and
  at least one context feature associated with the object feature, wherein each context feature is a characteristic of a group of objects or a group of pixels within the image from which the object feature was extracted, wherein the likelihood that the object belongs to a class of objects generated by the pre-trained classifier function is the context-aware feature. In this embodiment, the object feature may be identified empirically or may be identified automatically, such as by an advanced feature discovery method or by minimum redundancy and maximum relevance (mRMR) rules. In any of these embodiments, the at least one context feature may be capable of capturing cross-image variation among the same object feature in different images, for example, a group statistic of the object feature.

In another embodiment, a method of training an end classifier function of a biological image analysis device to identify an object of an image, the method comprising analyzing a training set of objects from a plurality of different images on the biological image analysis device, wherein the biological image analysis device is programmed to perform an end classifier training function by calculating for each object of the training a likelihood that the object belongs to a class of objects by combining:
  at least one context-aware feature for the object obtained by combining:
    at least one object feature extracted from the object, wherein the object feature is characteristic of the object in context of the image and wherein the object feature is susceptible to cross-image variation; and
    at least one context feature associated with the object feature, wherein each context feature is a characteristic of a group of objects or a group of pixels within the image from which the object feature was extracted; and
  an additional feature of the object.

The object feature(s) may be identified empirically or may be identified automatically, such as by an advanced feature discovery method or by minimum redundancy and maximum relevance (mRMR) rules. In any of these embodiments, the at least one context feature may be a feature capable of capturing cross-image variation among the same object feature in different images, for example, a group statistic of the object feature. In any of these embodiments, the additional feature of the object may be an additional object feature, and/or it may be an additional context-aware feature. If at least one of the additional features of the object is an additional context-aware feature, the additional context aware feature may be determined by a separate context-aware classifier. In another embodiment, a method of identifying an object in a test image of a biological sample is provided, the method comprising analyzing the object on a biological image analysis device programmed to perform an end classifier function by calculating a likelihood of the object belonging to a class of objects by combining a context-aware feature of the object with at least one additional feature of the object, wherein the end classifier function was trained according to any of the foregoing methods. In an exemplary embodiment, a pre-trained classifier was used to calculate the context-aware feature.

In another embodiment, a method of identifying an object in a test image is provided, the method comprising analyzing the test image on a biological image analysis device programmed to perform a classifier function to calculate a context-aware feature of the object in the test image by combining:
  at least one object feature extracted from the object, wherein the object feature is characteristic of the object in context of the image and wherein the object feature is susceptible to cross-image variation; and at least one context feature associated with the object feature, wherein each context feature is a characteristic of a group of objects or a group pixels within the image from which the object feature was extracted.

The object feature(s) may be identified empirically or may be identified automatically, such as by an advanced feature discovery method or by minimum redundancy and maximum relevance (mRMR) rules. In any of these embodiments, the at least one context feature may be a feature capable of capturing cross-image variation among the same object feature in different images, for example, a group statistic of the object feature.

In one embodiment, an end classifier further combines the context-aware feature with an additional feature of the object in the test image to calculate a likelihood that the object belongs to a class. The additional feature of the object may be an additional object feature, and/or it may be an additional context-aware feature. If at least one of the additional features of the object is an additional context-aware feature, the additional context aware feature may be determined by a separate context-aware classifier.

Also provided herein is a system for identifying an object in an image of a biological sample, the system comprising a biological image analysis device, wherein the biological image analysis device comprises: a processor; and a memory coupled to the processor, the memory to store computer-executable instructions that, when executed by the processor, cause the processor to perform operations comprising the method of any of the foregoing embodiments.

The system may optionally further comprise a device adapted to capture the image of the biological sample and to communicate the image of the biological sample to the biological image analysis device. For example, a microscope or whole slide scanner may be operably linked to the biological image analysis device, such that the image is digitally transmitted directly to the biological image analysis device. Additionally or alternatively, the microscope or whole slide scanner may comprise or be connected to a non-transitory computer readable storage medium adapted to save a digital copy of the image and further adapted to communicate the digital image to the biological image analysis device.

In another embodiment, a non-transitory computer readable storage medium for storing computer-executable instructions that are executed by a processor to perform operations, the operations comprising the method of any of the foregoing embodiments.

DETAILED DESCRIPTION

Figure 1A:
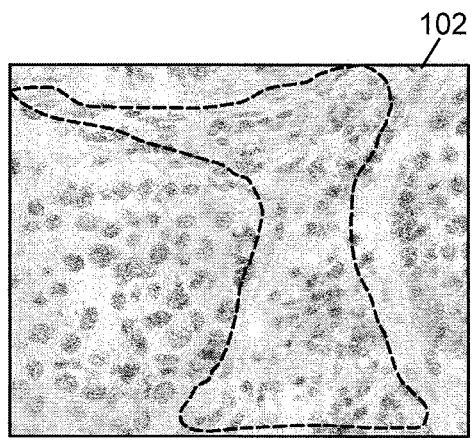
FIGS. 1A-1D show examples of ER stained breast cancer images. The annotated areas indicate the main locations of lymphocytes in FIGS. 1A and 1B; very few lymphocytes are present in FIGS. 1C and 1D. The images are scanned at 20× magnification level.
Figure 1B:
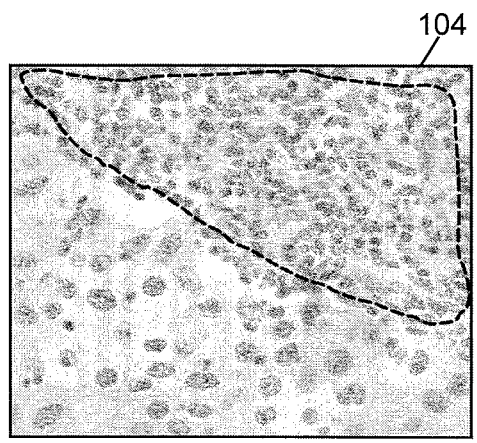
Figure 1C:
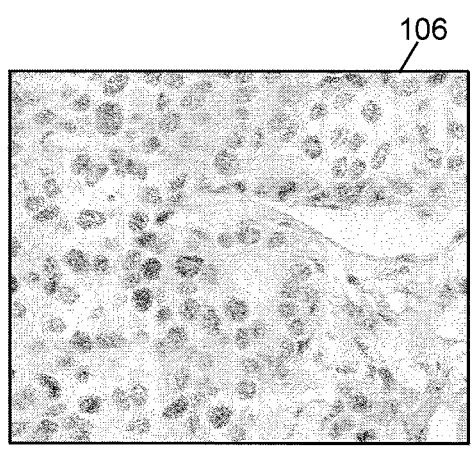
Figure 1D:
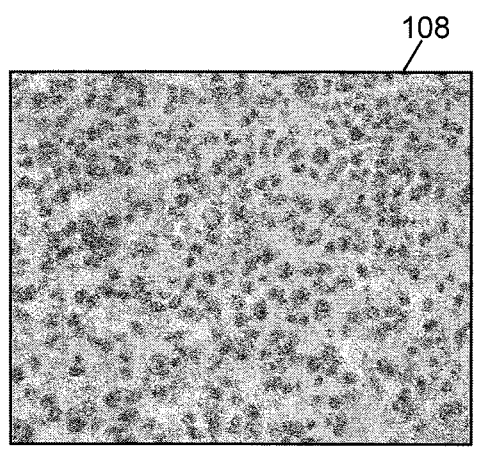

The present disclosure relates to computer-implemented methods, systems, and apparatuses use context-aware features of objects within an image of a biological sample to compensate for cross-image variations between different biological samples. A classifier is used to calculate a context-aware feature for an object in an image of the biological sample. The classifier is trained based on a three-factor framework:

(1) identifying at least one object feature that characterizes the object well within the image;
(2) identifying a set of context features associated with the object feature and can explicitly characterize the variation in the feature value due to the inter-image variation; and
(3) training a base classifier using the object feature and the associated context features to generate a numeric value representing the degree to which an object belongs to a class (context aware feature).

The same set of object features and context features for test objects within test images can then be fed into the pre-trained classifier to calculate the context-aware feature for the test object. The calculated context-aware features can then be used by an end classifier to calculate the likelihood that the object belongs to a specific class of objects.

These methods, systems, and apparatuses are especially useful in the field of histology, where automated analysis of stained and/or labeled tissues is hampered by natural variations in, for example, morphological characteristics, staining protocols, stain intensity, etc.

Images of Biological Sample

The present methods, systems, and apparatuses are useful for analyzing images of biological samples. As used herein, the term "biological sample" means any sample from an organism that containing cells—including for example, histological or cytological samples—that has been prepared for imaging by microscopy. In one specific embodiment, the biological samples are histological or cytological samples that have been mounted on an imaging medium (such as a microscope slide) and stained with a contrast agent that differentially labels structures within the biological sample. Exemplary contrast agents include, for example, dyes that differentially stain different macromolecular structures (such as hematoxylin and eosin) and molecular labels that bind to specific molecules within the biological sample (such antibodies against a specific protein or nucleic acids probes against specific DNA or RNA sequences). The biological samples are visualized under a microscope or scanned by a whole slide scanner and a digital image thereof is captured.

Biological Image Analysis Devices and Associated Systems

The present methods, systems, and apparatuses all include a biological image analysis device, which functions to analyze the image of the biological sample according to the presently disclosed methods. The biological image analysis device includes at least a processor and a memory coupled to the processor, the memory to store computer-executable instructions that, when executed by the processor, cause the processor to perform operations.

The term "processor" encompasses all kinds of apparatus, devices, and machines for processing data, including by way of example a programmable microprocessor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus also can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., an LCD (liquid crystal display), LED (light emitting diode) display, or OLED (organic light emitting diode) display, for displaying information to the user and a keyboard and a pointing device, e.g., a mouse or a trackball, by which the user can provide input to the computer. In some implementations, a touch screen can be used to display information and receive input from a user. Other kinds of devices can be used to provide for interaction with a user as well; for example, feedback provided to the user can be in any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include any number of clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

The skilled artisan will appreciate that the biological image analysis device described herein may be included within systems comprising additional components, e.g. analyzers, scanners, etc. For example, the biological image analyzer may be communicatively coupled to a computer-readable storage medium containing a digital copy of the image of the biological sample. Alternatively, the biological image analysis device may be communicatively coupled to an imaging apparatus. In general, an imaging apparatus can include, without limitation, one or more image capture devices. Image capture devices can include, without limitation, a camera (e.g., an analog camera, a digital camera, etc.), optics (e.g., one or more lenses, sensor focus lens groups, microscope objectives, etc.), imaging sensors (e.g., a charge-coupled device (CCD), a complimentary metal-oxide semiconductor (CMOS) image sensor, or the like), photographic film, or the like. In digital embodiments, the image capture device can include a plurality of lenses that cooperate to prove on-the-fly focusing. A CCD sensor can capture a digital image of the specimen. One method of producing a digital image includes determining a scan area comprising a region of the microscope slide that includes at least a portion of the specimen. The scan area may be divided into a plurality of "snapshots." An image can be produced by combining the individual "snapshots." In some embodiments, the imaging apparatus produces a high-resolution image of the entire specimen, one example for such an apparatus being the VENTANA iScan HT slide scanner from Ventana Medical Systems, Inc. (Tucson, Ariz.). The system can also include a desktop computer, a laptop computer, a tablet, or the like and can include digital electronic circuitry, firmware, hardware, memory, a computer storage medium, a computer program, a processor, or the like. The images can also be divided into a matrix of pixels. The pixels can include a digital value of one or more bits, defined by the bit depth. A network or a direct connection may interconnect the imaging apparatus and the computer system. The computer systems include one or more processors that are programmed with a series of computer-executable instructions, the instructions being stored in a memory.

When executed, instructions (which may be stored in the memory) cause at least one of the processors of the computer system to receive an input, which is a color image comprising a biological sample. Once the necessary inputs are provided, a module is then executed to derive object features and context features and to calculate object feature metrics and context feature metrics. The object feature metrics and context feature metrics are provided to a trained end classifier, which classifies the object and provide an output to the user. The output may be to a display, a memory, or any other means suitable in the art.

Object Features

As used herein, the term "object feature" refers to a property of an individual object that can be used to identify the object within the image in which the object is located. Examples of object features include the size, shape and average intensity of all pixels within the object.

The object feature can be a property that identifies the object well within a specific image, irrespective of cross-image variation. For example, in ER stained breast cancer images, nucleus size is an important object feature for lymphocytes because lymphocytes are usually smaller than cancer cells in the same image. Selecting this feature is independent of cross-image variation because variations in the nucleus size from sample to sample should not affect the relative size of the lymphocyte nuclei and cancer cell nuclei within the same specific image. By decoupling feature selection and image variation handling, the descriptive power of the selected object feature set is maximized within individual images.

Object features can be identified empirically, automatically, or a combination of both. In one embodiment, at least one object feature is identified automatically. In one embodiment, an object feature is identified using an advanced feature discovery (AFD) method or using a minimum redundancy and maximum relevance (mRMR) rule. An example of AFD is described at O. Dor and Y. Reich, "Enhancing learning algorithms to support data with short sequence features by automated feature discovery," Knowledge-Based Systems, v52, pp. 114-132 (2013). An example of mRMR is described at Peng, H. C., Long, F., and Ding, C., "Feature selection based on mutual information: criteria of max-dependency, max-relevance, and min-redundancy," IEEE Transactions on Pattern Analysis and Machine Intelligence, Vol. 27, No. 8, pp. 1226-1238, 2005. The precise methods of identifying object features will vary by the specific application.

An object feature may be computed "irrespective", i.e., "without taking account of", context information contained in a digital image. An object feature may or may not be susceptible to cross-image variation. In case it is affected by cross-image variation, the accuracy of class membership predictions based on said object feature may be increased by a classifier taking as input in addition a context feature associated with the object feature. The association can automatically be established during a learning phase of a classifier.

Thus, object features can be selected without taking cross-image variation of object feature values into account. An object feature is typically a feature of an object, e.g. a pixel blob representing a cell or a nucleus, which has predictive power for predicting class-membership of an object.

Context Features

As used herein, the term "context feature" refers to a feature describing a property of a group of objects or a group of pixels within the image that is useful for compensating for cross-image variation of the type of objects in the group.

For each selected object feature, a separate set of context features is selected. Association between the object feature and the context feature set is important, bearing in mind that the purpose is to compensate the cross-image variation instead of maximizing the descriptive power of the context feature set. For example, where the intra-image relative size of the object is important in identifying the object, the set of context features should include features that indicate whether the object is large or small in the context of that particular image. Additionally, the set of context features should have the capability to capture the cross-image variations so that they can be corrected in later stage.

In one embodiment, a group statistic for the same object feature is used as a context feature. For example, where the object feature is the size of the object, and normalization needs to be performed to determine whether the object is large or small in the context of the image, one context feature may be "the median size of all the objects in that image". The idea can be extended to indirectly related features, e.g., when the object feature is gradient based, the associated context feature can be the group statistics of intensities.

A context feature associated with an object feature as used herein is a feature derived from a plurality of objects or pixels of an image capable of leveling out inter-image variability of an object feature. Thereby, the context feature also levels out the variability of an object feature caused by other factors than class membership, which commonly results in inter-image variability.

Classifier Training and Application for Calculating Context Aware Features

Object features and their associated context features are used to train a classifier to generate a "context-aware feature." As used herein, the term "context-aware feature" refers to a numeric value generated by the classifier that represents the degree to which an object belongs to a class.

Examples of classifiers that are useful include supported vector machine classifiers, random forest classifiers, neural networks, and fuzzy-rule based system.

The classifier is used to obtain a result similar to "feature normalization" so that a given object feature can be directly compared across images. Instead of hand-crafting a normalization formula, a classifier incorporates the object feature and the context features (which constitute normalization factors). The object feature thus can be thought of as a feature of the object to be normalized and the context features can be thought of as normalization factors for the object feature.

At least one object feature that characterizes the objects well within the image is identified. For each object feature, a set of context features associated with the object feature is identified, wherein the context features can characterize cross-image variation.

The numeric output of the classifier can be understood as a quantity which is optimally derived from the input features to differentiate objects cross all the training images. Therefore, the adverse impact of the cross-image variation (captured by context features) to classification should be minimized through the training process. The quantity can then serve as a feature which describes the same property as the original object feature while optimally "normalized" for classification. On the other hand, if the descriptive power of the classifier's score turns out to be weaker than the original object feature, it is indicated that wrong context features are selected, or the cross-image variation compensation is not necessary.

There are multiple advantages of this approach. First, multiple normalization factors can be applied at the same time, thus multi-source variation can be addressed jointly. Second, the training process is also an information discovery process where the importance of each feature can be readily analyzed through the trained model. Third, due to the underlying optimization nature of the training process, noisy or irrelevant features are usually suppressed, thus putting less stringent requirement to normalization factor selection comparing to hand-crafting formulas.

Image Identification

A single context-aware feature in some cases may be sufficient to identify the object. In many cases, however, a variety of factors may be necessary to identify the object. In one embodiment, an end classifier is used to perform object identification. The end classifier incorporates the context-aware feature with other features of the object to calculate a likelihood that the object belongs to a class of objects. Examples of classifiers that are useful as an end classifier include supported vector machine classifiers, random forest classifiers, neural network, and fuzzy-rule based system. In one embodiment, multiple context-aware features are used by the end classifier to identify the object. In other embodiments, the end classifier combines at least one context-aware feature with at least one object feature.

Cross-image Variation

The term "intra-image variation", indicates the variation of object feature values of a plurality of objects, e.g. pixel blobs, within a particular digital image. Thereby, the digital image can be, for example, a whole-slide image or a sub-region thereof. To the contrary, "inter-image variation" and "cross-image variation" indicate the variation of object feature values of objects of different digital images.

As used herein, the term s "classifier" and "classifier function" are synonyms. An "image analysis system" may be implemented as an image analysis device and comprise e.g. a processor and a memory and/or a non-volatile storage medium, the memory and/or the storage medium having stored instructions that when executed by the processor cause the processor to perform an image analysis method according to embodiments of the disclosure.

EXAMPLES

Application in ER Stained Image Analysis

In ER stained image analysis, it is relatively simple to differentiate negative cancer cells and positive cancer cells, because the two classes have drastic difference in color. However, differentiating negative cancer cells and other non-cancer cells stained by hematoxylin, especially lymphocytes, is challenging because the color difference between the two classes is subtle, even moderate stain variation could have significant impact to the classification performance. In addition, size variation of the cancer cells also imposes difficulty in using size feature for classification.

FIG. 1 Shows example of ER stained breast cancer images. Positively expressed, DAB stained cancer cells appear brown and hematoxylin stained negatively expressed cancer cells and lymphocytes appear blue (the colors are not shown in the grey scale representation of said images). In relation to negative cancer cells in the same image, lymphocytes are generally dark in color, and smaller in size (FIG. 1 (a)(b)). When comparing different images, hematoxylin staying in (b)(d) are stronger than in (a)(c), while lymphocytes prevalence are stronger in (a)(b) than in (c)(d). Object feature variation can also be observed when comparing (b) and (d), where the cancer cells in (d) are visibly smaller than in (b). Embodiments of the disclosure may be capable of addressing both stain and biological variations during classification.

Identification of certain histological objects such as lymphocytes, cancer nuclei, and glands, is often one of the pre-requisites for quantitative analysis of histopathology images. For example in immunohistochemical (IHC) assessment of estrogen receptor (ER) stained slides, positively and negatively expressed tumor cells need to be identified. The proportion of the ER-positively expressed tumor cells in the tumor cell count may be computed as the ER score and used to predict if the patient will likely benefit from a particular therapy, e.g. endocrine therapy. Embodiments of the disclosure allow extracting image features that are invariant to the image appearance variations of different image areas, whereby the image variations may be caused due to heterogeneity of disease biology and differences in staining protocols. Performing a simple color distribution normalization aiming at improving stain appearance consistency is risky, because subtle color differences of cells may be caused by the fact that the cells belong to different cell types (tumor cells and lymphocyte cells) and not (only) by staining effects (see the heterogeneity of biological images represented by FIGS. 1a-1d: hematoxylin stain in (b)(d) are stronger than in (a)(c), while lymphocytes prevalence are stronger in (a)(b) than in (c)(d)).

Negatively stained tumor nuclei and lymphocytes for example may differ slightly both in respect to color intensity and size. Since the inter-image differences in color distribution could be mainly caused by object prevalence instead of stain variation, blindly aligning the color distribution may reduce the color discriminability and introduce more color confusion between the objects to be classified. To the contrary, by addressing both stain and biological variation, embodiments of the disclosure provide for a more accurate classification approach.

Figure 2:
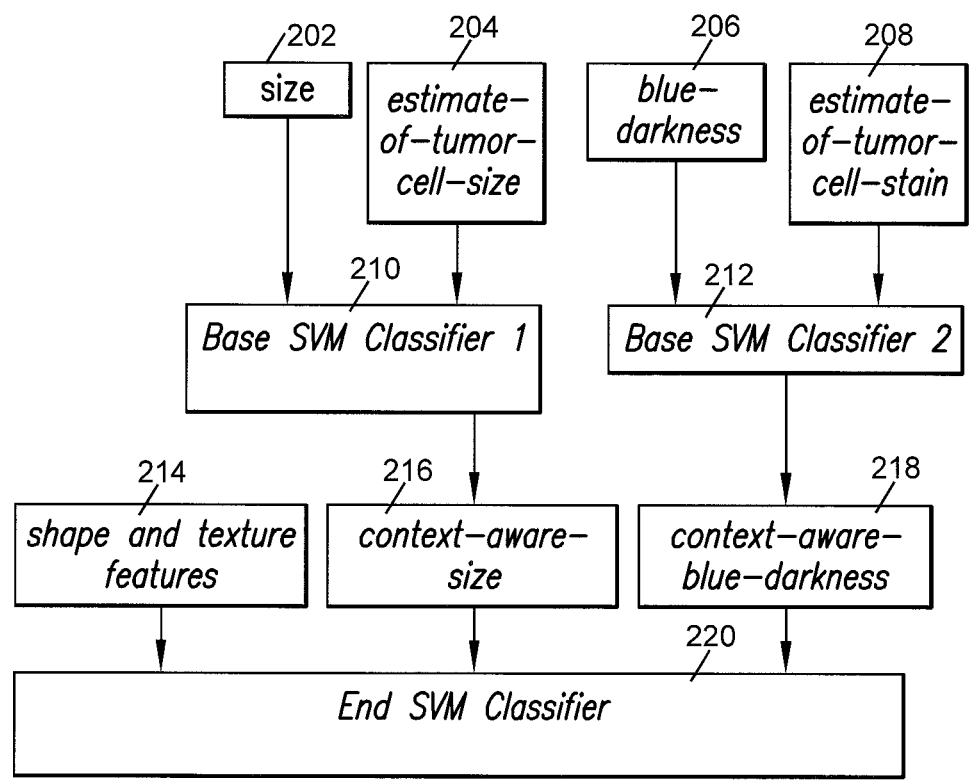
FIG. 2 is a diagram for computing the context-aware features and using them in the end classifier for classifying lymphocytes and negative tumor cells in ER stained images.

FIG. 2 is a diagram for computing the context-aware features and using them in the end classifier. For example, the computation could be performed by an image analysis system comprising a processor and memory or a digital electronic processing device.

Figure 3:
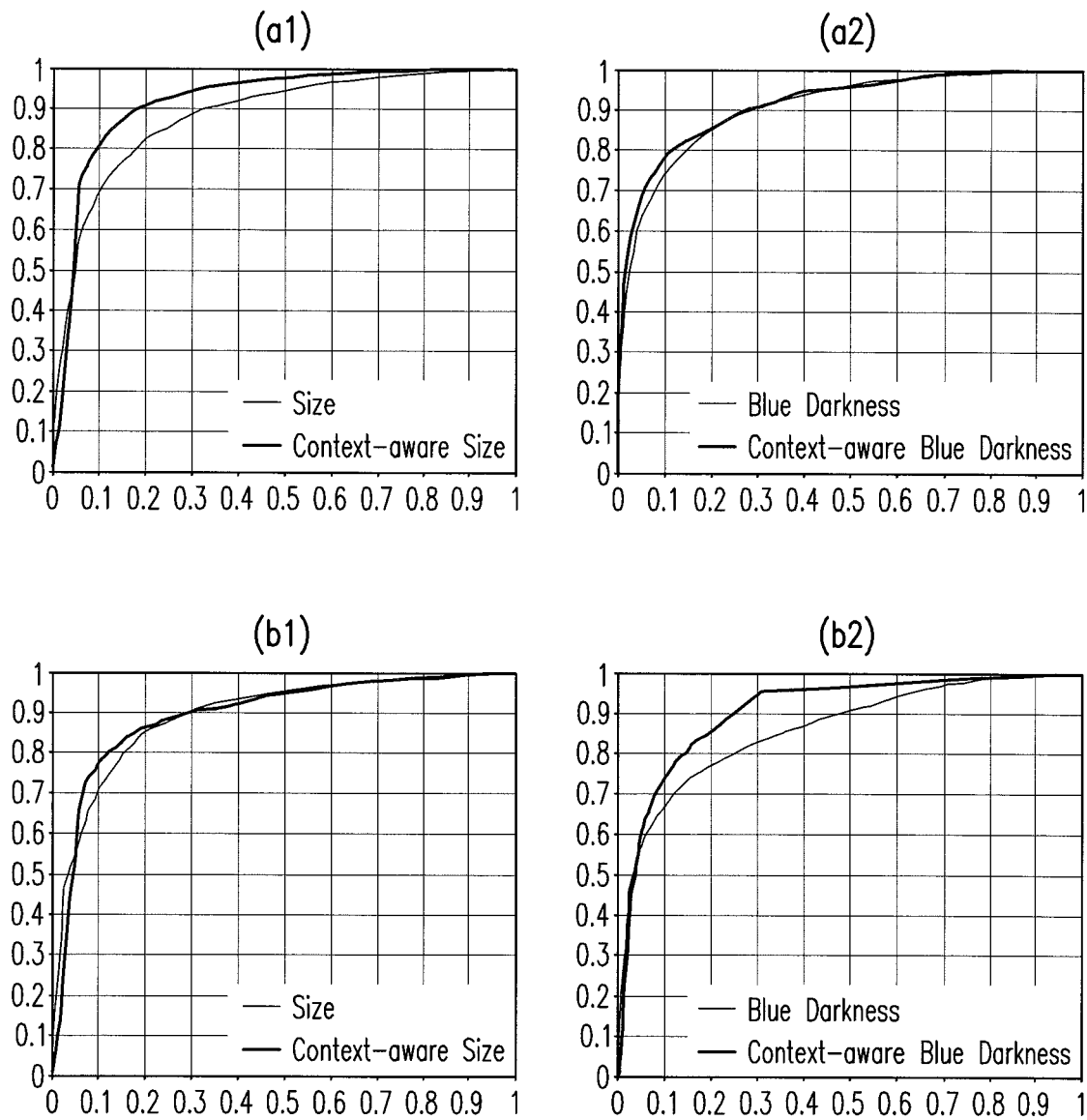
FIG. 3 shows ROC curves demonstrating the descriptive power of the original object feature and the context-aware feature. The context-aware features have stronger descriptive power in both training data (a1)(a2) and testing data (b1)(b2).

FIG. 3 is a ROC curve demonstrating the descriptive power of the original object feature and the context-aware feature. The x axis is the false classification ratio of one class (e.g. "lymphocytes", and the y axis is the true classification ratio of the other class (DAB unstained tumor cells). The context-aware features have stronger descriptive power in both training data (a1)(a2) and testing data (b1)(b2).

The training data consisted of a total of 210 field of view (FOV) images extracted from 81 whole slide (WS) ER stained breast cancer images. Within said training images, negative tumor cells and lymphocytes were manually annotated as the training data. The training data was input to an untrained version of a classifier, e.g. a linear SVM classifier, to obtain trained linear SVM models capable of computing the context-aware-size and context-aware-blue-darkness. The ROC curves in FIGS. 3a1, 3a2 both show that the resulting context-aware feature (i.e., the likelihood of being a cell of a particular cell type) have a greater descriptive power than the object feature alone.

To validate the method, 93 testing FOVs were extracted from additional 31 whole slide images and manually annotated as well. A ROC curve was used to evaluate the descriptive power of each feature also for the test dataset and revealed a higher predictive accuracy of the context-aware features compared to the mere object features "Size" and "Blue Darkness" also in the test dataset.

Figure 4A:
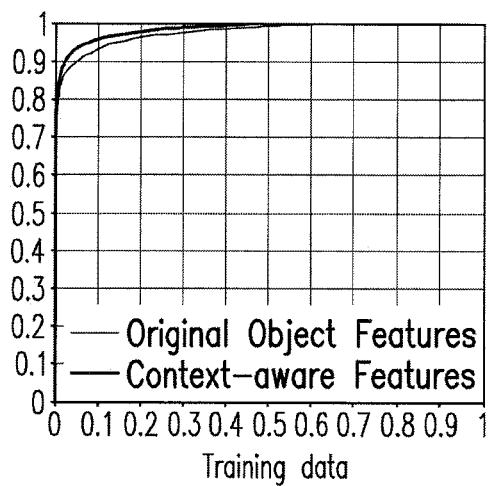
FIGS. 4A and 4B depict ROC curves showing end classifier performance comparison.
Figure 4B:
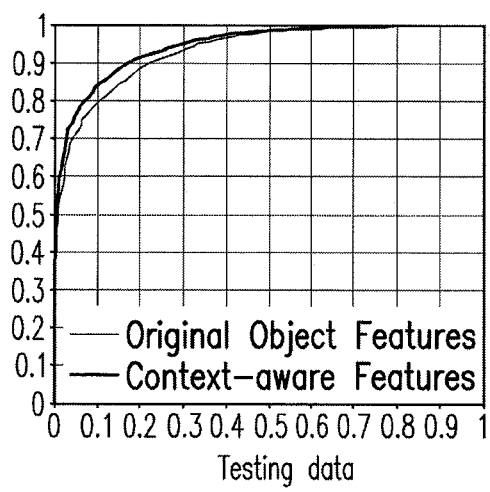

FIG. 4 is a ROC curve showing end classifier performance comparison. FIG. 4 shows that the descriptive power of the context-aware features is obviously stronger than that of the original object feature in both training and testing data.

Figure 5:
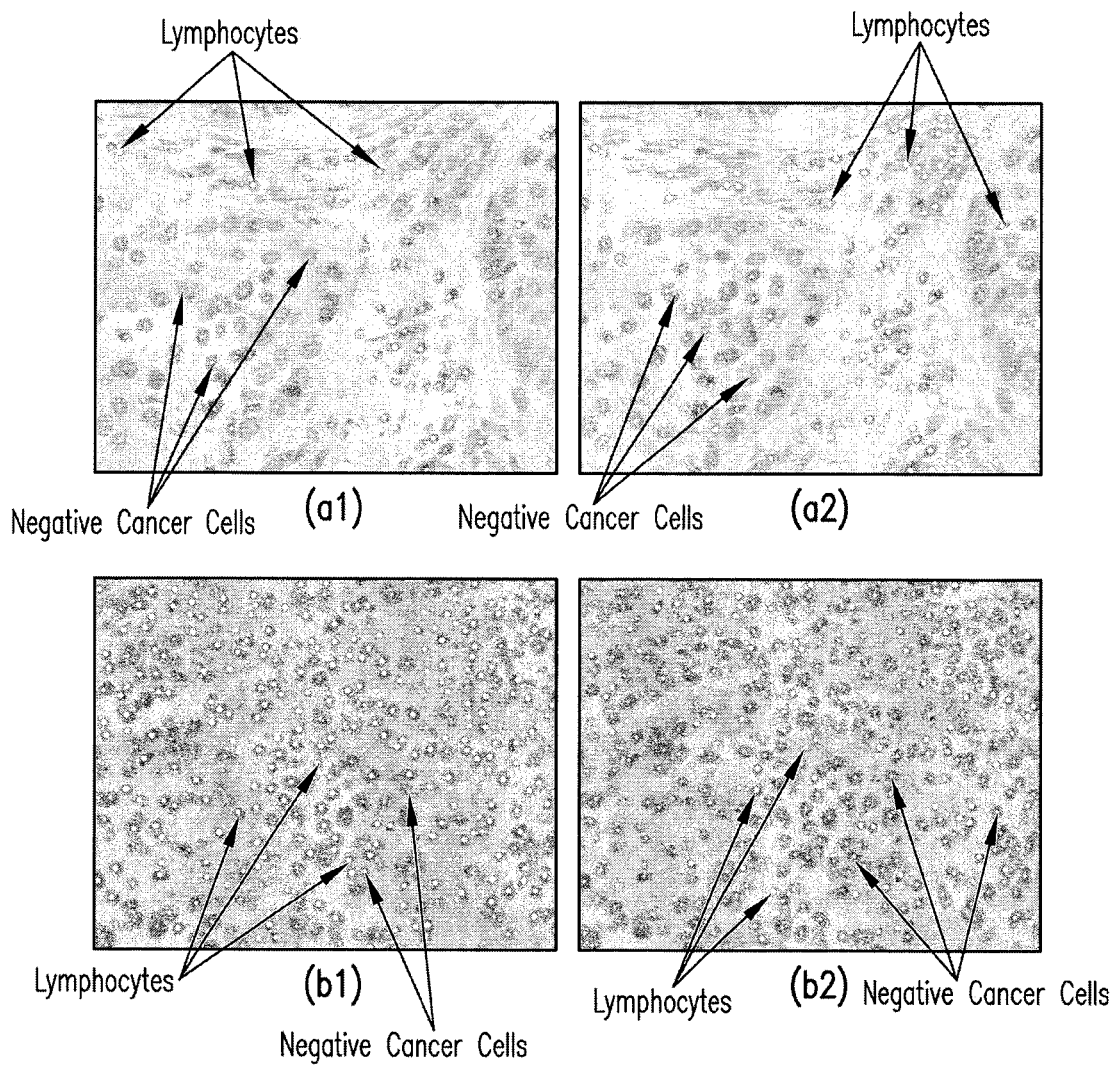
FIG. 5 shows end classification results on example test images. (a1)(b1) use the original object features, (a2)(b2) use the context-aware features. The arrows overlaid on the image indicate the nuclei class label: negative cancer cells and lymphocytes.

FIG. 5 shows examples of the end classifier results, where using context-aware features yields less errors that misclassify lymphocytes as negative cells ("negatively stained tumor cells", i.e., tumor cells not having bound a respective biomarker and a corresponding label or stain) in weakly stained images (see FIG. 5(a2) vs. FIG. 5(a1)); and vice versa in strongly stained images (see FIG. 5(b2) vs. FIG. 5(b1)). In FIG. 5 (a1)(b1) the original object features were used. In FIG. 5 (a2)(b2) the context-aware features were used. The arrows overlaid on the image indicate the nuclei class label: negative cancer cells and lymphocytes.

Figure 6:
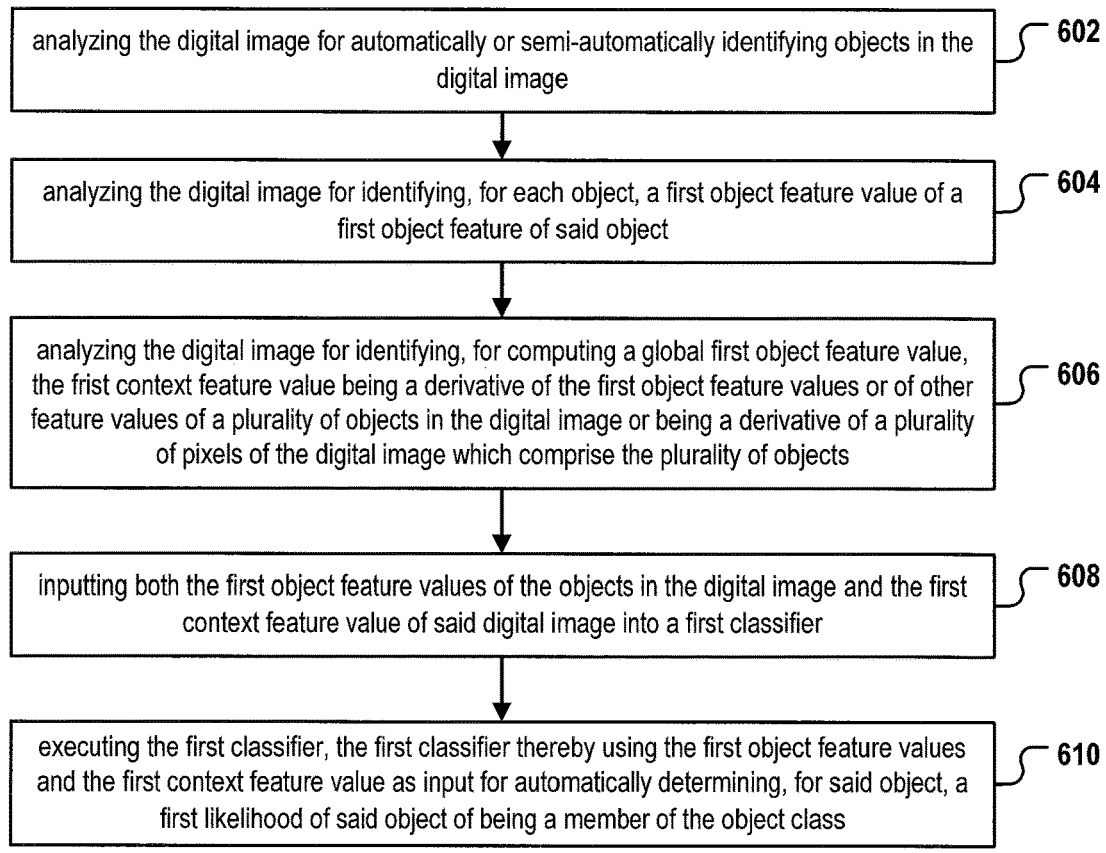
FIG. 6 shows a flow chart of a method of classifying objects in a digital image.
Figure 7:
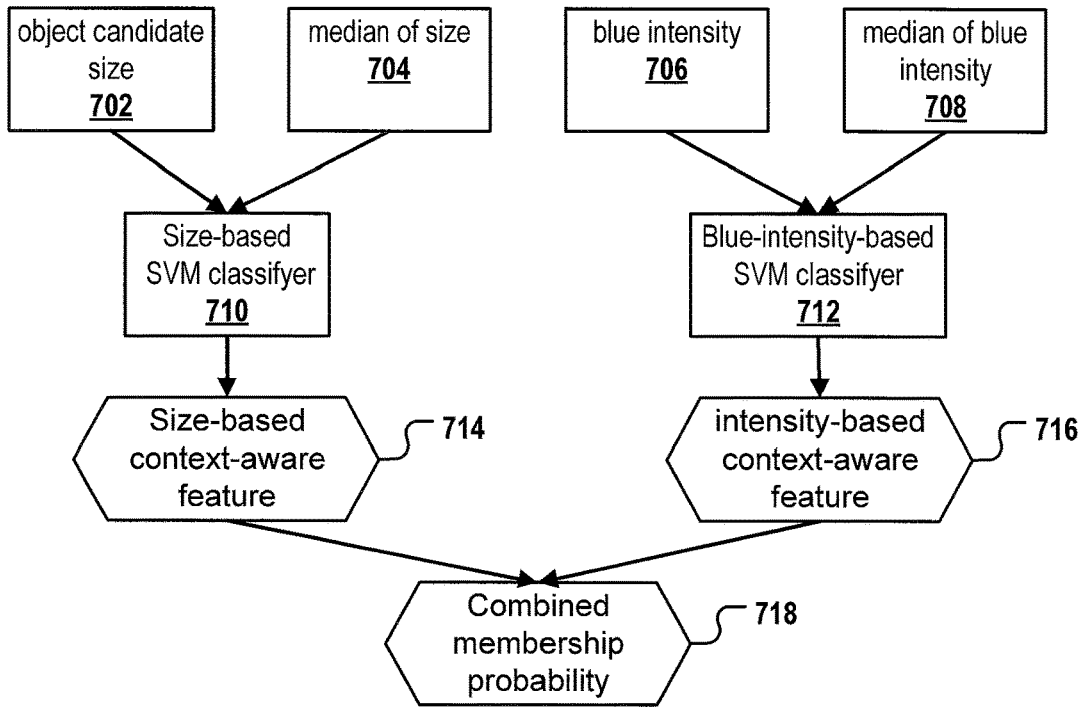
FIG. 7 shows a diagram illustrating the use of two different classifiers for calculating a combined likelihood of a particular object by using two different classifiers.

FIG. 6 shows a flow chart of a method for classifying objects in a digital image. The method can be performed by one or more classifiers as depicted in FIG. 7. In the following paragraphs, embodiments of the disclosure will be described by making reference to FIGS. 6 and 7.

Framework

Embodiments of the disclosure incorporate individual object information and context information to calculate a refined likelihood (context-aware feature) that is compensated for inter-image variations. According to embodiments, a general framework to compute such feature is composed of three steps:

Step1. Identify an object feature which characterizes the object well within the image.

Step2. Identify a set of context features which are associated with the particular object feature and can explicitly characterize the variation in the feature value due to the inter-image variation.

Step3. Train a base classifier using the above object and context features. The numeric output of this base classifier that indicates the likelihood of an object belonging to a given class is called the "context-aware" feature.

Feature Selection Phase

In this step, the features ("properties") which shall be evaluated during classification are identified. In a first step, object features refer to those describing the properties of an individual object, e.g., size, shape, intensity, etc. These features can be hand-crafted through visual observation, or identified by advanced feature discovery method. Using either method, the focus is to find features that best characterize the object within the image without involving the feature value variations cross images. For example, for lymphocyte identification problems in ER stained breast cancer images, nuclei size is an important feature because lymphocytes are usually smaller than cancer cells in the same image. Biological variation in size as shown in FIG. 1a-d should not interfere with feature selection in this step as it will be handled in later steps. Thus, by decoupling feature selection and image variation handling, the descriptive power of the selected object feature can be maximized for individual images.

In a next step, the context features refer to those describing the properties of all or a subgroup of objects or pixels within the image, e.g., the mean brightness intensity of all the blue objects. For each selected object feature, a separate set of context features needs to be identified as each object feature may be affected by different factors cross images. Association between the object feature and the context feature set is important bearing in mind that the purpose is to compensate for the inter-image variation instead of maximizing the descriptive power of the context feature set. Therefore, correlation between the object feature and the context features is expected, which is actually what we want to discover in the next step. As an example, the right question to ask in this step is: "Given the size of a particular object, what feature can tell me if the object is large or small within that image?" In addition, the context feature should have the capability to capture the inter-image variations so that they can be corrected at the later stage. A straightforward way of finding such context features is to derive a group statistic of the same object feature. For example, one answer to the above sample question is: "The median size of all the objects in that image". The idea can be extended to indirectly related features, e.g., when the object feature is gradient based, the associated context feature can be the group statistics of intensities.

In effect, the selection of appropriate features may result in a kind of "feature normalization" so that feature values can be directly compared across images. However, no hand-crafted normalization formula needs to be implemented. Rather, a standard classifier, such as support vector machine SVM or random forest RF can be utilized and trained to incorporate the object feature (i.e., the feature to be normalized) and the context features (i.e., the normalization factors). The numeric output of the classifier, e.g. the score of a SVM, which indicates the likelihood of an object belonging to a class, can be understood as a quantity which is optimally derived from the input features to differentiate objects cross all the training images. Therefore, the adverse impacts of the inter-image variations (captured by context features) should have been minimized through the training process. The quantity can then serve as a feature which describes the same object feature as the original object feature while optimally "normalized" for classification.

The context-aware features can be used to train an end classifier to solve the addressed classification problem, as exemplified in the next section.

Training Phase

Before the actual object classification can start, for each object feature of a cellular or sub-cellular object to be identified, a respective classifier has to be created. This can be done by annotating hundreds or even thousands of pixel blobs or other structures in one or more training images with annotations indicating to which object class said pixel blobs or structures belong. For example, the pixel blobs could be brown blobs resulting from a DAB staining and indicating whole cells, the pixel blobs could be blue blobs resulting from a hematoxylin staining of any kind of nuclei (which may be more intense in some types of nuclei than in others), could be membrane structures, cell clusters, or the like.

The annotated images are input to an untrained classifier, e.g. a support vector machine, a neural network, or any other kind of unsupervised learning program logic.

For example, a first object feature considered could be the size of the blue pixel blobs (corresponding to nuclei) and the intensity of blue color resulting from a hematoxylin staining.

At first, an untrained version of a first classifier 710, e.g. an SVM, may analyze the training digital image to calculate training context feature values and determine feature values of a particular object feature. The analysis may comprise applying a nuclear detection algorithm that detects nuclear blobs in the training digital image and computing a training first context feature value as the median of the diameters of all detected nuclear blobs. The diameters of all pixel blobs "first object feature value" and the training context first feature value are used as input for training the first classifier 710, also referred to as "size based classifier". In other embodiments, the relevant "size" may not be the diameter of a nucleus but rather the diameter of a whole cell.

In addition, an untrained version of a second classifier 712, e.g. an SVM or any other form of supervised learning algorithm, may analyze the training digital image to identify all nuclear pixel blobs and calculate an average "blue" intensity value of all pixel blobs as the second context feature value of the training digital image. The intensity values of the individual objects and the training second context feature values are both used as input for training the second classifier 712, also referred to as "blue intensity based classifier". In other embodiments, the relevant "color" may not be blue (hematoxylin), but rather brown (e.g. DAB staining) or a grayscale value.

Depending on the embodiment, the first and second classifiers may both be SVMs, neuronal networks, or any other type of classifier. According to embodiments, the type of the first and the second classifier differs. In some embodiments, a "super-classifier" or "end-classifier" is provided that takes the likelihoods 714, 716 output by each of the object feature-specific classifiers as input for calculating a final, combined likelihood 718 of a particular object to belong to a particular class (e.g. "lymphocyte cell"). For example, the end-classifier could be a nonlinear SVM classifier, e.g. a Gaussian kernel SVM. The likelihoods 714, 716 could be percentage values or other numerical values which are indicative of a likelihood of an object to be a member of a particular class.

Classification Phase

After having trained one or more object feature-specific classifiers 710, 712, each analyzer is applied on a new, unknown digital image or a sub-area thereof, e.g. a FOV selected by a user. The classification method may be implemented e.g. by an image analysis system comprising a processor and memory and/or a non-transitory storage medium for storing the digital image. The image analysis application may be configured for automatically identifying if a particular object is a member of said class (e.g. "lymphocyte cell" or "tumor cell") or not.

At first, the image analysis system or a sub-module of the first classifier 710 analyzes in step 602 the digital image for automatically or semi-automatically identifying objects in the digital image. Then in step 604, the image analysis system or the sub-module analyze the digital image for identifying, for each object, a first object feature value 702 of a first object feature ("nuclear diameter") of said object. In step 602, the digital image is analyzed for identifying a first context feature value 704. The first context feature value is indicative of a relation of the respective first object feature values of the objects in the digital image to context information, e.g. an "expected" or "average" first object feature value derived from object feature values of a plurality of objects or pixels in the digital image. For example, the information conveyed by a particular first object feature value in combination with an assigned context feature value could be that the diameter of said object is 45% of the diameter of all objects (blue pixel blobs) in said digital image. Both the object feature value and the associated context feature value are evaluated by the model of the classifier created in the training phase and will both contribute to the value of a "context-aware feature", i.e. a data value indicative of the likelihood of an object to be member of a particular object class. In case the cells and objects of the particular image or sub-area are larger than usual, the lymphocyte may therefore—if only an absolute value is considered—not be identified as a member of the "lymphocyte class". However, the relative information reveals that the object may very well be a lymphocyte (which is typically of a smaller size than a tumor cell), because its relative diameter compared to all other objects (i.e., pixel blobs that might be lymphocytes or tumor cells) is smaller than average.

In step 608 the first classifier uses both the first object feature value of the object and the first context feature value of the image as input. The first classifier is executed for automatically determining, for each of the objects, a first likelihood 714 of being a member of the object class.

According to embodiments, the image analysis system or a sub module of the second classifier 712 analyze the digital image for identifying, for each object, a second object feature value 706 of a second object feature of said object and for calculating a second context feature value 708. The second object feature values of all objects and the second context feature value or another context feature value assigned to the second object feature values are input into a second classifier 712; As was described above, the second context feature value 708 may be a group statistic of the second object feature value, e.g. an average "blue" intensity value of all objects in an image. The second classifier 712 automatically determines, for each of the objects, an intensity based context aware feature 716 indicating a likelihood 716 of being a member of the object class.

Computation of a Combined Likelihood

The image analysis system may comprise or be operatively coupled to a piece of program logic, e.g. an end-classifier or any other program logic configured for aggregating likelihoods, that takes the calculated likelihoods of all object feature-specific classifiers as input for calculating a combined likelihood 718. In some embodiments, the end classifier will in addition use additional object features (without any context features) as input for calculating the combined ("overall") likelihood. The combined likelihood indicates the overall likelihood that a particular object is a member of a particular object class, e.g. "lymphocyte". In case the combined likelihood exceeds a threshold value, e.g. 50%, the object is automatically identified as a member of the respective object class, e.g. "lymphocyte cell".

According to some embodiments, the combined likelihood 718 may be calculated as the arithmetic mean of all object feature specific likelihoods, e.g. (size-based-based likelihood 714+blue-intensity-based membership likelihood 716)/2. According to other embodiments, the computation of the combined likelihood 718 may be more complex. For example, the object feature specific likelihoods 710, 712 may be weighted in accordance with the predictive power of the respective object feature, whereby the weights may be predefined or may be automatically determined during a training phase of an end-classifier that shall compute the combined likelihood. It is also possible that the data values 714, 716 are not likelihood values but other forms of numerical values being indicative of a likelihood an object belongs to a particular class.

Figure 8:
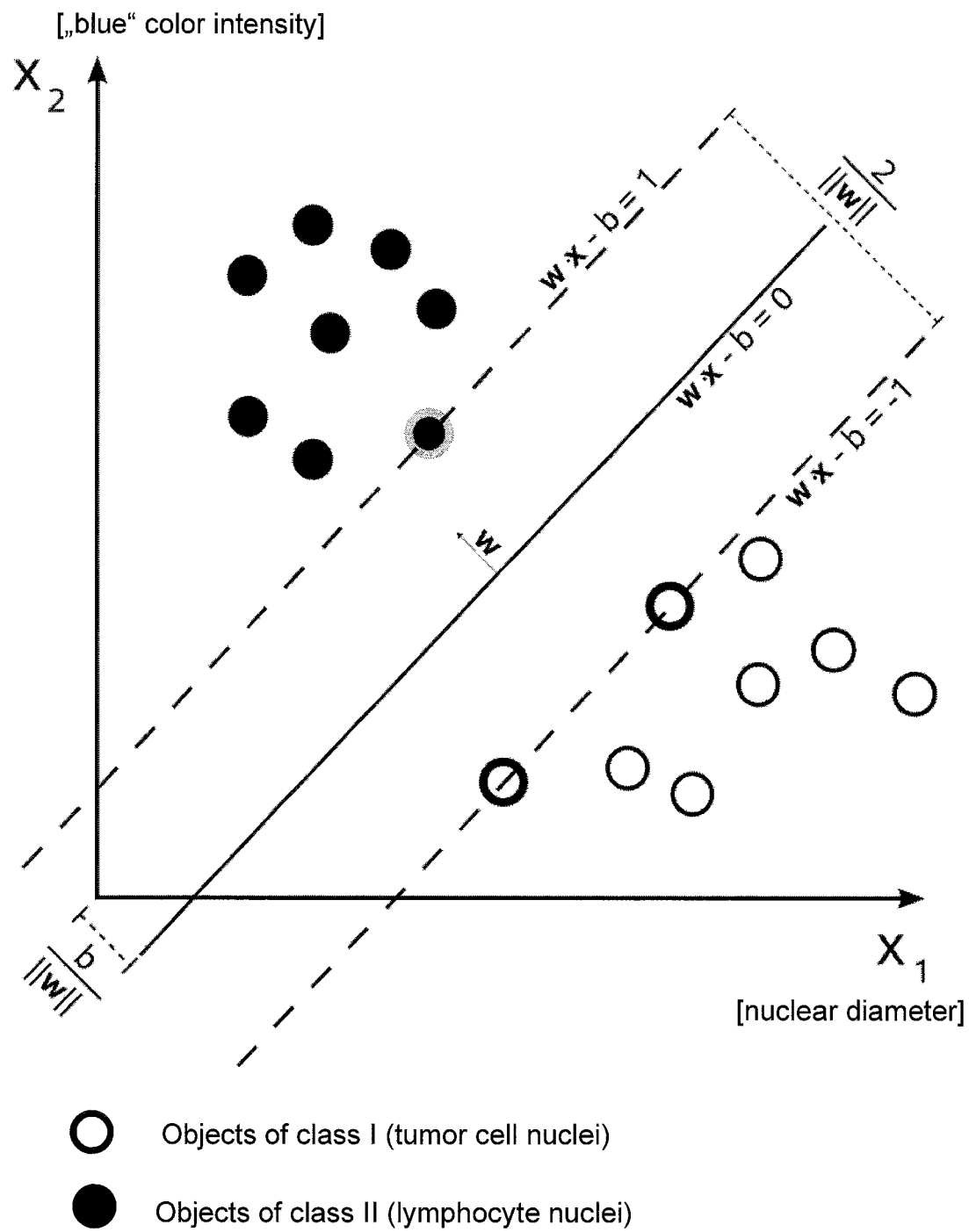
FIG. 8 shows a maximum margin hyperplane and margins for an SVM trained with samples from two annotated object classes (lymphocytes and tumor-cells).

FIG. 8 shows a maximum-margin hyperplane and margins for an SVM trained with samples from two object classes (lymphocytes and tumor-cells). Each pixel blob in a training digital image and each object in a digital image whose content shall be classified can be represented as a p-dimensional data point, wherein each object feature of the object class corresponds to one dimension.

Training an SVM means identifying a p-1 dimensional hyperplane capable of separating the data points in accordance with the respective object feature values of the data points that inner-class variance is minimized. The trained SVM represents a linear classifier. There are many hyperplanes that might classify the data. One reasonable choice as the best hyperplane is the one that represents the largest separation, or margin, between the two classes. So the hyperplane is chosen such so that the distance from it to the nearest data point on each side is maximized. If such a hyperplane exists, it is known as the maximum-margin hyperplane and the resulting, "trained" SVM is a linear classifier, also referred to as a maximum margin classifier.

According to embodiments, the first, second and/or further classifier is a linear SVM classifier. Given some training data $\mathcal{D}$, a set of n data points of the form $$\mathcal{D} = \{(x_i, y_i) | x_i \in \mathbb{R}^p, y_i \in \{-1, 1\}\}_{i=1}^n$$

where the $y_i$ is either 1 or −1, indicating the object class to which the data point $x_i$ belongs. A data point may be, for example, a pixel blob in a training image or an object in a test image to be analyzed. An object can be, for example, the output of a generic nuclei detection or cell detection algorithm that identifies nuclei or cells of any kind of cell type.

Each data point $x_i$ is a P-dimensional real vector. Each dimension corresponds to an object feature of the object class to be identified, or an associated context feature e.g. "absolute nuclear diameter" and "median nuclear diameter of all nuclear blobs in an image; or "absolute blue-color-intensity" and "median of the blue-color-intensity of all nuclear blobs in an image"; or "absolute nuclear blob roundness" and "average nuclear roundness of all nuclear blobs in an image"; or "absolute distance to next neighboring cell" and "average distance to next neighboring cell" or the like. It is also possible that not all nuclear blobs in an image are considered as objects, but rather a subset of all nuclear blobs is considered as the objects. For example, all nuclear blobs of a minimum size or of a minimum intensity value may selectively be considered as objects.

During the training phase, the maximum-margin hyperplane that divides the points having $y_i=1$ from those having $y_i=-1$ shall be identified. Any hyperplane can be written as the set of points x satisfying $$w \cdot x - b = 0,$$

where * denotes the dot product and w the (not necessarily normalized) normal vector to the hyperplane. The parameter $$\frac{b}{\|w\|}$$

determines the offset of the hyperplane from the origin along the normal vector w.

If the training data are linearly separable, two hyperplanes which separate the data are selected where there are no points between them, and the distance of said hyperplanes is maximized. The region bounded by them is called "the margin". These hyperplanes can be described by the equations $w \cdot x - b = 1$ and $w \cdot x - b = -1$.

By using geometry, the distance between these two hyperplanes is $$\frac{2}{\|w\|},$$

whereby $\|w\|$ is to be minimized. In order to prevent data points from falling into the margin, the following constraint is added: for each i either $$w \cdot x_i - b \geq 1 \text{ for } x_i \text{ of the first object class}$$

or $$w \cdot x_i - b \leq -1 \text{ for } x_i \text{ of the second object class.}$$

This can be rewritten as:

$$y_i(w \cdot x_i - b) \geq 1, \text{ for all } 1 \leq i \leq n. \quad (1)$$

Accordingly, the optimization problem can be formulated as:

Minimize (in $w, b$) $\|w\|$ subject to (for any $i=1, \ldots, n$) $y_i(w \cdot x_i - b) \geq 1$.

This optimization problem is difficult to solve because it depends on $\|w\|$, the norm of w, which involves a square root. Fortunately it is possible to alter the equation by substituting $\|w\|$ with $\frac{1}{2}\|w\|^2$ (the factor of ½ being used for mathematical convenience) without changing the solution (the minimum of the original and the modified equation have the same w and b). This is a quadratic programming optimization problem. More clearly:

$$\underset{(w,b)}{\operatorname{argmin}} \frac{1}{2}\|w\|^2$$

subject to (for any i=1, . . . , n)

$$y_i(w \cdot x_i - b) \geq 1.$$

By introducing Lagrange multipliers α, the previous constrained problem can be expressed as $$\underset{w,b}{\text{argmin}} \underset{\alpha \geq 0}{\max} \left\{ \frac{1}{2} \|w\|^2 - \sum_{i=1}^{n} \alpha_i [y_i(w \cdot x_i - b) - 1] \right\}$$

This corresponds to a search for a saddle point. In doing so all the points which can be separated as $y_i(w \cdot x_i - b) - 1 > 0$ do not matter since it is necessary to set the corresponding $a_i$ to zero. This problem can now be solved by standard quadratic programming techniques and programs. The "stationary" Karush-Kuhn-Tucker condition implies that the solution can be expressed as a linear combination of the training vectors $$w = \sum_{i=1}^{n} \alpha_i y_i x_i.$$

Only a few $a_i$ will be greater than zero. The corresponding $x_i$ are exactly the support vectors, which lie on the margin and satisfy $y_i(w \cdot x_i - b) = 1$. From this one can derive that the support vectors also satisfy $$w \cdot x_i - b = \frac{1}{y_i} = y_i \Longleftrightarrow b = w \cdot x_i - y_i$$

which allows one to define the offset b. The b depends on $y_i$ and $x_i$, so it will vary for each data point in the sample. In practice, it is more robust to average over all $N_{SV}$ support vectors, since the average over the sample is an unbiased estimator of the population mean:

$$b = \frac{1}{N_{SV}} \sum_{i=1}^{N_{SV}} (w \cdot x_i - y_i)$$

For example, in a training phase of a classifier for the object feature "nuclear-diameter", the normal vector to the hyperplane, "w", could be calculated according to $$w = \sum_{i=1}^{n} \alpha_i y_i x_i,$$

where $y_i = -1$ if $x_i$ is a tumor cell, and $y_i = 1$ if $x_i$ is a lymphocyte. Each data point $x_i$ is a 2-dimensional real vector $[D_i, \overline{D}_i]$, $D_i$ is the nuclear diameter value of the ith object, and $\overline{D}_i$ could be the average nuclear diameter of all the objects in the image which $x_i$ belong to.

Note that $x_i$ (i=1, 2, . . . , n) could be from multiple different images. Each image has a corresponding $\overline{D}_i$ value, which is the same to all the data points belonging to the same image, but could vary from image to image. As the result, "w" is also a 2-dimensional real vector, as being [−8.69 2.85]. The offset "b" could be calculated according to $$b = \frac{1}{N_{SV}} \sum_{i=1}^{N_{SV}} (w \cdot x_i - y_i)$$

which is a real number, as being −1.07.

Then, the trained SVM classifier for the "nuclear-diameter" object feature is used to classify objects in a digital image as being lymphocyte cells or tumor cells. The image may comprise 144 objects. The objects have been obtained by a state-of-the art nuclear detection algorithm, a blob detection algorithm, a cell detection algorithm or the like that typically does not discriminate between nuclei or cells of different cell types.

In order to classify the object "#15", the following steps are performed:
Identify the nuclear diameter of the object #15: 5.34 μm; said data value may also be referred to as "property value" of the object or "object feature value".
Identify the average nuclear diameter of all objects in the image:

$$\left( \frac{\text{sum of all diameters of 144 objects in the image}}{144} \right) = \frac{866.88 \text{ μm}}{144} = 6.02 \text{ μm}.$$

Then, the size-based likelihood that the object #+15 is a tumor cell is calculated by calculating a "context aware feature" being indicative of an object class a particular object most likely belongs to. For example, the context-aware feature (CAW) value can be calculated as follows:

CAW(size,#15)=−1.07−8.69*nuclear-diameter-of-#15+2.85*average-nuclear-diameter-of the-image CAW(size,#15)=−1.07−8.69*5.34 μm+2.85*6.02 μm=−1.07−46,40[μm]+17.16[μm]=30,31.

Thereby, the units [μm] may be ignored. The "average-nuclear-diameter-of the-image" may also be referred to as "context feature" or "context feature". The above equation may also be referred to the "model" of the trained SVM classifier.

The above formula computes the distance of the data point to the hyperplane that is derived during training process. The larger the value (>>0) the more likely the object is a lymphocyte cell. The lower the value (<<0) the more likely the object is a tumor cell. A value close to 0 indicate strong ambiguity, but still a decision can be made by checking whether the value is >0 or <0 and classifying objects.

The value of w [−8.69 2.85] also indicates the effectiveness of the model. First, the weight applied to the nuclear-diameter (−8.69) has the largest absolute value, indicating the likelihood is dominantly impacted by the nuclear-diameter. Second, larger nuclear-diameter and lower average-nuclear-diameter leads to higher likelihood of being tumor cell; the opposite sign of the two parameters reveals that a "compensating" mechanism has been learned though the training process. In other words, even if an object has very large absolute nuclear diameter, as most the nucleus in the image are pretty large, the likelihood of being a tumors should be lower than that in the case where most the nucleus are small. Here, the relative relation between the absolute nuclear diameter and the average nuclear diameter is not characterized explicitly by either percentage or difference, but the derived model tells how to combine the two quantities linearly to optimally separate the tumor cells from the lymphocytes.

As an example, FIG. 1 shows four ER stained breast cancer images. Positively expressed, DAB stained cancer cells appear brown, negatively expressed cancer cells and lymphocytes appear blue as they are both stained by hematoxylin (the colors are not shown in the gray scale representation of the images). Meanwhile, compared with negative cancer cells in the same image, lymphocytes are generally darker in color, and smaller in size (FIG. 1(a)(b)); when comparing cross images, hematoxylin stain in (b)(d) are stronger than in (a)(c), while lymphocytes prevalence are stronger in (a)(b) than in (c)(d).

Thus, the size and the hematoxylin (blue) staining intensity may be used as an object feature for training and applying a classifier. In the following, a proposed method is developed to address these problems.

In a first step, brown and blue blobs are detected through adaptive thresholding in unmixed DAB and hematoxylin channels obtained through color deconvolution, respectively. See, e.g., Ruifrok, A. C. and Johnston, D. A., "Quantification of histochemical staining by color deconvolution," Analytical and quantitative cytology and histology/the International Academy of Cytology [and] American, Society of Cytology 23(4), pp. 291-299 (2001). Based on the observation that lymphocytes generally appear as "smaller, rounder and darker blue blobs" in an image, size, blue-darkness and features related to blob shape and neighborhood textures are hand-picked as the object features. Size is defined as the total number of pixels in the object; blue-darkness is characterized by the mean intensity of the object in a difference-of-Gaussian (DoG) image derived from the hematoxylin channel. For example, the size may be a first object feature and the blue-darkness may be used as a second object feature.

In the second step, context features are selected only for size and blue-darkness as their inter-image variations are observed to be the most prominent. The context feature for size is decided to be the median size of all brown blobs in the image, which is called estimate-of-tumor-cell-size. Brown blobs are preferred in some embodiments because the size statistic of blue blobs depends on the prevalence of the lymphocytes and may vary greatly cross images.

In this particular example, the "brown blobs" in the image are used as objects for calculating the context feature. The brown blobs are actually dominantly tumor cell nuclei. Only in very rare cases, lymphocytes nuclei can be stained brown. Therefore the median size of the brown blobs is a good estimate of the mean tumor cell nuclear size.

In case there are no brown blobs present in the image, Otsu threshold of blue blob sizes can be used and there is no impact to the final ER score, which is zero. See, e.g., Nobuyuki Otsu (1979) "A threshold selection method from gray-level histograms" IEEE Trans. Sys., Man., Cyber. 9(1):62-66. Doi:10.1109/TSMC.1979.4310076. For blue-darkness, the context feature is the mean hematoxylin channel intensity of all the blue blobs whose sizes are greater than the estimate-of-tumor-cell-size. We called it estimate-of-tumor-cell-stain.

Otsu threshold, although less reliable than the brown blobs' size statistics, can reasonably separate the groups whose object feature values are closely distributed around different means. In this particular example, prior knowledge is used to identify the group of objects to derive the most relevant contexture feature, namely, the "estimate-of-cancer-cell-size". In more general case, when no such prior knowledge is available, the statistic of all objects in the image or some histogram information of the digital image can be used directly as the context features.

In a next step, two linear SVM classifiers are trained to compute the context-aware-size and context-aware-blue-color-darkness features respectively, using the above selected object and context features. Linear SVM is adopted because the resulting model boils down to a linear combination of the input features, making context-aware feature calculation very easy. This also makes the analysis of the feature relation straightforward, as the weight of each feature indicates the importance of that feature, and the weight signs reflect how the object feature and context features interfere with each other.

Finally, an end linear SVM classifier is trained using the context-aware-size, context-aware-blue-darkness and the original shape and texture features. The above steps are illustrated in FIG. 2.

The proposed method is used to improve the feature robustness to cross-image variation. Comparing to the approach where all the object features and context features are fed into a single end classifier, using separate classifier enable the user to specifically address the issues associated with a particular feature. User also has the flexibility to choose different classifier for different features and change context feature designs, which facilitates easier incorporation of prior knowledge. The method can be extended to generate semantic-level features to describe more complicated biological properties.

Results

A total of 210 field of view (FOV) images are extracted from 81 whole slide (WS) ER stained breast cancer images, in which negative tumor cells and lymphocytes are manually annotated as the training data. The trained linear SVM models to compute the context-aware-size and context-aware-blue-darkness both show that the object feature gets the largest weight, indicating that the resulting context-aware feature generally describes the same property as the corresponding object feature. Meanwhile, the weight of the context feature has the opposite sign as the object feature, indicating that a compensating mechanism is learned through training. To validate the method, 93 testing FOVs are extracted from additional 31 whole slide images and manually annotated as well. ROC curve is used to evaluate the descriptive power of each feature as well as the end classifier performance, where the x axis is the false classification ratio of one class, and the y axis is the true classification ratio of the other class For example, the trained linear SVM models to compute the context-aware-size=−1.96−8.37*size+1.53*estimate-of-cancer-cell-size, i.e., w=[−8.37 1.53], b=−1.96;

and the context-aware-blue-color-darkness=1.70+8.22*blue-color-darkness −4.28*estimate-of-cancer-cell-stain, i.e., w=[8.22-4.28], b=1.70.

In both models, the object feature gets the largest weight, indicating it is the dominating feature; thus that the resulting context-aware feature generally describes the same property as the corresponding object feature.

As shown in FIG. 3, the descriptive power of the context-aware feature is obviously stronger than the original object feature for both training and testing data. FIG. 3 a1 corresponds to FIG. 1 a1. FIG. 3 a2 corresponds to FIG. 1 a2. FIG. 3 b1 corresponds to FIG. 1 b1. FIG. 3 b2 corresponds to FIG. 1 b2. The ROC curves of FIG. 3 thus indicate the gain in accuracy by training a classifier based on a respective feature ("property") and by applying the trained classifier on an unknown digital image.

The end classifier using the context-aware feature also outperforms that using the original object features (FIG. 4). FIG. 4 shows a ROC curve illustrating the accuracy provided by calculating a combined likelihood from the likelihoods provided by all individual, object feature-specific likelihoods.

CONCLUSION

Stain variation and biological variation cross images impose great challenge for quantitative analysis of histopathology images. Color distribution alignment approach aiming at improving the stain appearance consistency cross images is not suitable for classification problem where the color difference between classes are subtle; and the color distribution difference could be caused by object prevalence instead of stain variation. This disclosure describes a general method which incorporates object feature and context feature through utilization of a standard classifier, the learned model is used to derive the context-aware features which are compensated for cross-image variations. The method can be used to address a wide range of feature variation issues. Effectiveness of the method is demonstrated in nuclei classification problem for ER stained breast cancer image analysis.

The invention claimed is:

1. An image analysis system for identifying objects belonging to a particular object class in a digital image of a biological sample, the system comprising a processor and memory, the memory comprising interpretable instructions which, when executed by the processor, cause the processor to perform a method comprising:
   analyzing the digital image for automatically or semi-automatically identifying a plurality of objects in the digital image;
   analyzing the digital image for identifying, for each object of the plurality of objects, a first object feature value of a first object feature of said object, thereby identifying a plurality of first object feature values;
   analyzing the digital image for computing a first context feature value, the first context feature value being a derivative of the plurality of first object feature values or of a plurality of other object feature values of the plurality of objects in the digital image or being a derivative of a plurality of pixels of the digital image;
   inputting both the plurality of first object feature values and the first context feature value of said digital image into a first classifier; and
   executing the first classifier, the first classifier thereby using the plurality of first object feature values and the first context feature value as input for automatically determining, for each object of the plurality of objects, a first likelihood of said object of being a member of the particular object class, thereby determining a plurality of first likelihoods of the plurality of objects of being a member of the particular object class.

2. The system of claim 1, wherein the determination of the plurality of first likelihoods comprises using, by the first classifier, the first context feature value for leveling out one or more first object feature value variations caused by factors other than a membership of the plurality of objects to one of a plurality of object classes.

3. The system of claim 1, wherein the method further comprises:
   a) analyzing the digital image for identifying, for each object of the plurality of objects, a second object feature value of a second object feature of said object, thereby identifying a plurality of second object feature values;
   b) analyzing the digital image for computing one or more second context feature values, each second context feature value of the one or more second context feature values being a derivative of the plurality of second object feature values or of the plurality of other object feature values of the plurality of objects in the digital image or being a derivative of the plurality of pixels of the digital image;
   c) inputting both the plurality of second object feature values and the one or more second context feature values of said digital image into a second classifier;
   d) executing the second classifier, the second classifier thereby using the plurality of second object feature values of and the one or more second context feature values for automatically determining, for each object of the plurality of objects, a second likelihood of said object of being a member of the particular object class, thereby determining a plurality of second likelihoods of the plurality of objects being a member of the particular object class; and
   e) computing, for each of the objects of the plurality of objects, a combined likelihood of being a member of the object class from the first likelihood and the second likelihood computed for said object, thereby determining a plurality of combined likelihoods of the plurality of objects of being a member of the particular object class.

4. The system of claim 3, wherein each object of the plurality of objects has assigned at least one further object feature, the system comprising the first classifier and the second classifier and comprising a further classifier for each of the further properties, wherein the method further comprises:
   repeating steps a) to d) for each of the further properties for respectively calculating a further likelihood of each object of being a member of the object class, thereby calculating a plurality of further likelihoods of each object of the plurality of objects being a member of the particular object class; and
   computing, for each of the objects, a combined likelihood of being a member of the object class from the first plurality of likelihoods, the second plurality of likelihoods, and the further plurality of likelihoods.

5. The system of claim 1,
   wherein the digital image is an image of a biological sample or a whole tissue slide; or
   wherein the digital image is a sub-region within an image of a biological sample or a sub-region within a whole tissue slide.

6. The system of claim 5, the method comprising:
   selecting the sub region by automatically or manually identifying a sub region of the digital image including a second plurality of objects having a lower heterogeneity in respect to one or more of their properties than a plurality of other objects within one or more other sub regions of said digital image; and
   using the identified sub region as the digital image for which the first context feature value, a second context feature value and/or one or more further context feature values are calculated.

7. The system of claim 1,
   wherein the first context feature value indicates a first variation in the plurality of first object feature values caused by inter-image variation; and/or
   wherein a second context feature value indicates a second variation in a plurality of second object feature values caused by inter-image variation; and/or wherein each further context feature value of one or more further context feature values indicates one or more further variations in a plurality of respective further object feature values caused by inter-image variation.

8. The system of claim 1,
wherein computing the first context feature value comprises computing a statistical average of the first object feature values of the plurality of objects or pixels in the digital image; and/or
wherein computing a second context feature value comprises computing a statistical average of a plurality of second object feature values of the plurality of objects or pixels in the digital image; and/or
wherein computing each further context feature value of one or more further context feature values comprises computing a statistical average of a respective plurality of further object feature values of the plurality of objects or pixels in the digital image.

9. The system of claim 1, wherein the particular object class is one of: a lymphocyte cell, a tumor cell, a cell of a particular tissue type, a cell positively stained with a particular biomarker, a nucleus of any one of said cell types.

10. The system of claim 1, wherein each first object feature value of the plurality of first object feature values corresponds to one of:
 i. an intensity value of the object, the intensity value correlating with the amount of a stain or a biomarker bound to the object;
 ii. a diameter of the object;
 iii. a size of the object;
 iv. a shape property;
 v. a distance of an object to a next neighbor object; and
 vi. a texture property; and
wherein in case a plurality of second object feature values and/or a plurality of further object feature values is analyzed, each second object feature value of the plurality of second object feature values or each further object feature value of the plurality of further object feature values corresponds to a remaining one of properties i-vi.

11. The system of claim 1, wherein the method further comprises:
 inputting one or more first, second, and/or further properties into a respective classifier, wherein the first, second and/or further properties are:
 specified manually; or
 specified by an advanced feature discovery method; or
 specified by a minimum redundancy and maximum relevance (mRMR) rules.

12. The system of claim 11, wherein the one or more first, second, and/or further object features of the plurality of objects:
 vary within all objects in the digital image; and/or
 vary within objects of the same digital image, the digital image being a whole slide image; and/or
 vary within objects of the same digital image, the digital image being a sub-region of a whole slide image; and/or
 vary within objects belonging to different digital images derived from different tissue samples of the same organism; and/or
 vary within different individuals of the same species.

13. The system of claim 1, the method further comprising generating the first classifier by:
 reading, by an untrained version of the first classifier, a plurality of digital training images from a storage medium, each training digital image comprising a plurality of pixel blobs respectively representing objects of one or more different object classes, each pixel blob being annotated as a member or as a non-member of the object class;
 analyzing each of the training digital images for identifying, for each annotated pixel blob, a training first object feature value of the first object feature of said pixel blob;
 analyzing each of the training digital images for computing a training first context feature value, the training first context feature value being a derivative of the training first object feature values or of other training object feature values of a plurality of pixel blobs in said training digital image or being a derivative of a plurality of pixels of the training image; and
 training the untrained version of the first classifier by inputting, for each of the pixel blobs, at least the annotation, the training first object feature value and the training first context feature value to the untrained version of the first classifier, thereby creating the first classifier, the first classifier being configured to calculate a higher likelihood for an object of being a member in a particular object class in case the first object feature value of said object is more similar to the training first object feature values of the pixel blobs annotated as being a member of said particular object class than to the training first object feature values of pixel blobs annotated as not being a member of said particular object class, whereby the likelihood further depends on intra-image context information contained in the first or other context feature values.

14. The system of claim 1,
wherein the calculating of the first likelihood of the first classifier comprises using, by the first classifier, the first context feature value for leveling out first object feature value variations caused by factors other than the membership of the object to one of a plurality of object classes; and/or
wherein the training of the untrained version of the first classifier comprises identifying, by the first classifier, one of a plurality of properties capable of increasing the classification accuracy of the first classifier using the first object feature for classifying objects, the identified property increasing the classification accuracy by leveling out first object feature value variations caused by factors other than the membership of the object to one of a plurality of object classes, the training comprising modifying a classifier model of the first classifier in a way that an input context feature value calculated for the identified property modulates the likelihood calculated for an object by using the first object feature value of said object as input.

15. An image analysis method for identifying objects belonging to a particular object class in a digital image of a biological sample, the method being performed by a processor of an image analysis system and comprising:
 analyzing the digital image for automatically or semi-automatically identifying a plurality of objects in the digital image;
 analyzing the digital image for identifying, for each object of the plurality of objects, a first object feature value of a first object feature of said object, thereby identifying a plurality of first object feature values;
 analyzing the digital image for computing one or more first context feature values, each first context feature value being a derivative of the plurality of first object feature values or of a plurality of other object feature values of the plurality of objects in the digital image, or being a derivative of a plurality of pixels of the digital image;

inputting both the plurality of first object feature values and the one or more first context feature value of said digital image into a first classifier; and executing the first classifier, the first classifier thereby using the plurality of first object feature values and the one or more first context feature values as input for automatically determining, for each object of the plurality of objects, a first likelihood of said object of being a member of the particular object class, thereby determining a plurality of first likelihoods of the plurality of objects of being a member of the particular object class.

16. A non-transitory computer readable storage medium for storing computer-executable instructions that are executed by a processor to perform operations, the operations comprising:

analyzing a digital image for automatically or semi-automatically identifying a plurality of objects in the digital image;

analyzing the digital image for identifying, for each object of the plurality of objects, a first object feature value of a first object feature of said object, thereby identifying a plurality of first object feature values;

analyzing the digital image for computing one or more first context feature values, each first context feature value being a derivative of the plurality of first object feature values or of a plurality of other object feature values of the plurality of objects in the digital image, or being a derivative of a plurality of pixels of the digital image;

inputting both the plurality of first object feature values and the one or more first context feature value of said digital image into a first classifier; and executing the first classifier, the first classifier thereby using the plurality of first object feature values and the one or more first context feature values as input for automatically determining, for each object of the plurality of objects, a first likelihood of said object of being a member of a particular object class, thereby determining a plurality of first likelihoods of the plurality of objects of being a member of the particular object class.

\* \* \* \* \*